United States Patent
Griffin

(10) Patent No.: US 8,353,633 B2
(45) Date of Patent: Jan. 15, 2013

(54) BEARING ASSEMBLY SUPPORT AND ADJUSTMENT SYSTEM

(75) Inventor: Daniel J. Griffin, Enfield, CT (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/381,410

(22) PCT Filed: Jan. 11, 2011

(86) PCT No.: PCT/US2011/020746
§ 371 (c)(1),
(2), (4) Date: Dec. 29, 2011

(87) PCT Pub. No.: WO2011/088004
PCT Pub. Date: Jul. 21, 2011

(65) Prior Publication Data
US 2012/0106883 A1 May 3, 2012

Related U.S. Application Data

(60) Provisional application No. 61/295,615, filed on Jan. 15, 2010.

(51) Int. Cl.
*F16C 23/00* (2006.01)
(52) U.S. Cl. ......... 384/255; 384/215; 384/247; 384/428
(58) Field of Classification Search .................. 384/99, 384/192, 215, 216, 220, 247, 250, 252, 253, 384/255, 257, 428–430, 441
See application file for complete search history.

(56) References Cited

U.S. PATENT DOCUMENTS

| 2,231,323 A | 2/1941 | Cawood |
| 3,295,801 A | 1/1967 | McDowal et al. |
| 3,630,586 A | 12/1971 | Pitner |
| 3,683,734 A | 8/1972 | Claussen |
| 3,827,337 A | 8/1974 | Pruvot |
| 3,947,153 A | 3/1976 | Matthias et al. |
| 4,063,786 A | 12/1977 | Rall |
| 4,128,280 A | 12/1978 | Purtschert |
| 4,141,604 A | 2/1979 | Habermann et al. |

(Continued)

FOREIGN PATENT DOCUMENTS

GB 590202 * 1/1945

(Continued)

OTHER PUBLICATIONS

PCT/US2010/051922 International Search Report and Written Opinion dated Jun. 30, 2011 (8 pages).

(Continued)

*Primary Examiner* — James Pilkington
(74) *Attorney, Agent, or Firm* — Edmonds & Nolte, PC

(57) ABSTRACT

A bearing assembly support and adjustment system includes an annular support device and an annular adjustment sleeve. The annular support device has a support device outer circumferential surface located about a first axis and a support device inner circumferential surface located about a second axis spaced apart from the first axis. The annular adjustment sleeve has an adjustment sleeve outer circumferential surface located about a third axis and an adjustment sleeve inner circumferential surface located about a fourth axis spaced apart from the third axis. The annular adjustment sleeve is coupled to the annular support device with the adjustment sleeve outer circumferential surface located immediately adjacent the support device inner circumferential surface.

16 Claims, 29 Drawing Sheets

U.S. PATENT DOCUMENTS

| | | | |
|---|---|---|---|
| 4,213,661 | A | 7/1980 | Marmol |
| 4,460,283 | A | 7/1984 | Yoshioka et al. |
| 4,526,483 | A | 7/1985 | Hishikawa et al. |
| 4,542,994 | A | 9/1985 | Mohsin |
| 4,545,586 | A | 10/1985 | Von Pragenau |
| 4,553,855 | A | 11/1985 | De Choudhury |
| 4,597,676 | A | 7/1986 | Vohr et al. |
| 4,657,414 | A | 4/1987 | Stella |
| 4,683,111 | A | 7/1987 | Helm et al. |
| 4,827,169 | A | 5/1989 | Habermann |
| 4,872,767 | A | 10/1989 | Knapp |
| 4,929,158 | A | 5/1990 | Girault |
| 4,982,126 | A | 1/1991 | Jolivet et al. |
| 5,021,697 | A | 6/1991 | Kralick |
| 5,083,053 | A | 1/1992 | New |
| 5,126,612 | A | 6/1992 | Girault |
| 5,231,323 | A | 7/1993 | New |
| 5,272,403 | A | 12/1993 | New |
| 5,341,527 | A | 8/1994 | Schmidt et al. |
| 5,347,190 | A | 9/1994 | Lewis et al. |
| 5,355,040 | A | 10/1994 | New |
| 5,425,584 | A | 6/1995 | Ide |
| 5,521,448 | A | 5/1996 | Tecza et al. |
| 5,547,287 | A | 8/1996 | Zeidan |
| 5,616,976 | A | 4/1997 | Fremerey et al. |
| 5,630,881 | A | 5/1997 | Ogure et al. |
| 5,683,185 | A * | 11/1997 | Buse ................. 384/295 |
| 5,693,994 | A | 12/1997 | New |
| 5,714,818 | A | 2/1998 | Eakman et al. |
| 5,749,700 | A | 5/1998 | Henry et al. |
| 5,752,774 | A | 5/1998 | Heshmat et al. |
| 5,803,612 | A | 9/1998 | Battig |
| 5,810,485 | A | 9/1998 | Dublin, Jr. et al. |
| 5,977,677 | A | 11/1999 | Henry et al. |
| 6,036,435 | A | 3/2000 | Oklejas |
| 6,078,120 | A | 6/2000 | Casaro et al. |
| 6,155,720 | A | 12/2000 | Battig |
| 6,194,801 | B1 | 2/2001 | Goransson |
| 6,196,809 | B1 | 3/2001 | Takahashi et al. |
| 6,244,749 | B1 | 6/2001 | Nakagawa et al. |
| 6,309,174 | B1 | 10/2001 | Oklejas, Jr. et al. |
| 6,310,414 | B1 | 10/2001 | Agahi et al. |
| 6,353,273 | B1 | 3/2002 | Heshmat et al. |
| 6,398,400 | B1 * | 6/2002 | Nienhaus ................. 384/255 |
| 6,402,385 | B1 | 6/2002 | Hayakawa et al. |
| 6,770,993 | B1 | 8/2004 | Heshmat et al. |
| 6,846,158 | B2 | 1/2005 | Hull |
| 6,987,339 | B2 | 1/2006 | Adams et al. |
| 7,240,583 | B2 | 7/2007 | Wingett et al. |
| 7,264,430 | B2 | 9/2007 | Bischof et al. |
| 7,367,713 | B2 | 5/2008 | Swann et al. |
| 7,429,811 | B2 | 9/2008 | Palazzolo et al. |
| 7,694,540 | B2 | 4/2010 | Ishida et al. |
| 7,836,601 | B2 | 11/2010 | El-Shafei |
| 8,109,168 | B2 * | 2/2012 | Wurm et al. ................. 74/412 R |
| 2004/0047526 | A1 | 3/2004 | Dewachter |
| 2004/0189124 | A1 | 9/2004 | Baudelocque et al. |
| 2006/0204153 | A1 | 9/2006 | Alam et al. |
| 2007/0036476 | A1 | 2/2007 | Lane et al. |
| 2009/0302698 | A1 | 12/2009 | Menz et al. |
| 2010/0021095 | A1 | 1/2010 | Maier |
| 2011/0052109 | A1 | 3/2011 | Tecza et al. |

FOREIGN PATENT DOCUMENTS

| | | |
|---|---|---|
| JP | 08-082397 A | 3/1996 |
| JP | 2001-124062 A | 5/2001 |
| KR | 10-1989-0010437 A | 8/1989 |
| KR | 10-0207986 B1 | 7/1999 |
| WO | 91-017367 | 11/1991 |
| WO | 01-057408 A1 | 8/2001 |
| WO | 2006-098806 A1 | 9/2006 |
| WO | 2007-047976 A1 | 4/2007 |
| WO | 2011-044423 A1 | 4/2011 |
| WO | 2011-044428 A1 | 4/2011 |
| WO | 2011-044430 A1 | 4/2011 |
| WO | 2011-044432 A1 | 4/2011 |
| WO | 2011-020746 A1 | 7/2011 |

OTHER PUBLICATIONS

PCT/US2010/051927 International Search Report and Written Opinion dated Jun. 30, 2011 (8 pages).

Tecza and Walton, "A Chambered Porous Damper for Rotor Vibration Control: Part I—Concept Development" in The American Society of Mechanical Engineers, NY, 7 pages.

Walton and Martin, "A Chambered Porous Damper for Rotor Vibration Control: Part II—Imbalance Response and Bladeloss Simulation" in The American Society of Mechanical Engineers, NY, 7 pages.

PCT/US2010/051930 International Search Report and Written Opinion dated Jun. 30, 2011 (8 pages).

PCT/US2010/051932 International Search Report and Written Opinion dated Jun. 30, 2011 (8 pages).

PCT/US2011/020746 International Search Report and Written Opinion dated Sep. 23, 2011 (8 pages).

"Auxiliary Bearings in Vertically Oriented Machines on Magnetic Bearings," EPRI, Palo Alto, CA: 2001. 1003177.

Extended European search report for EP 06817242.8 dated Aug. 7, 2009, 3 pages.

Supplementary European search report for EP 06817242.8 dated Aug. 25, 2009, 1 page.

International Preliminary Report on Patentability for PCT/US2006/041127 dated Apr. 23, 2008, 4 pages.

Written Opinion of the International Searching Authority for PCT/US2006/041127 dated Mar. 19, 2007, 3 pages.

* cited by examiner

BEARING ASSEMBLY SUPPORT AND ADJUSTMENT SYSTEM

CROSS-REFERENCE TO RELATED APPLICATIONS

This application claims priority to U.S. Patent Application Ser. No. 61/295,615, which was filed Jan. 15, 2010. The priority application is hereby incorporated by reference in its entirety into the present application.

BACKGROUND

This disclosure relates in general to machinery, and in particular to bearing assemblies for supporting rotating portions of such machinery.

Support devices for bearing assemblies conventionally include a horseshoe-shaped arc spring that deflects under loading transferred from a shaft to the bearing assembly. These conventional springs tend to provide controlled stiffness in the vertical direction and are typically stiffer in the horizontal direction than is desirable. Furthermore, these conventional springs are adjusted to compensate for the weight of the shaft using shims, which is time consuming.

Therefore, what is needed is an improved bearing assembly support and adjustment system

SUMMARY OF THE INVENTION

Embodiments of the disclosure may provide a bearing assembly support and adjustment system. The system can include an annular support device having a support device outer circumferential surface located about a first axis, and a support device inner circumferential surface located about a second axis spaced apart from the first axis. The system can also include an annular adjustment sleeve having an adjustment sleeve outer circumferential surface located about a third axis and an adjustment sleeve inner circumferential surface located about a fourth axis spaced apart from the third axis, wherein the annular adjustment sleeve is coupled to the annular support device with the adjustment sleeve outer circumferential surface located immediately adjacent the support device inner circumferential surface.

Embodiments of the disclosure may provide a shaft support and adjustment system. The exemplary system may include a housing, a bearing coupled to the housing and defining a bore, a shaft located in the bore, and a support and adjustment device located between the housing and the bearing. The support and adjustment device may include an annular support device having a plurality of spring portions, a support device outer circumferential surface located about a first axis and engages the housing, and a support device inner circumferential surface located about a second axis spaced apart from the first axis. The support and adjustment device may further include an annular adjustment sleeve having an adjustment sleeve outer circumferential surface located about a third axis and engages the support device inner circumferential surface, and an adjustment sleeve inner circumferential surface that engages the bearing and is located about a fourth axis spaced apart from the third axis. In at least one embodiment, the annular support device is operable to be rotated relative to the annular adjustment sleeve in order to move the fourth axis along a line relative to a perimeter of the annular support device.

Embodiments of the disclosure may provide a method for supporting and adjusting a shaft. The method can include providing an annular support device coupled to an annular adjustment sleeve. The annular adjustment sleeve may define an adjustment sleeve bore operable to receive a shaft, deflecting the annular support device with a load to determine an offset of a shaft axis relative to a desired axis when a shaft is positioned in the adjustment sleeve bore, and rotating the annular support device relative to the annular adjustment sleeve in order to move an axis of the adjustment sleeve bore such that the offset of the shaft axis relative to the desired axis is reduced when a shaft is positioned in the adjustment sleeve bore.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 16b is a schematic view illustrating an embodiment of the annular support device of FIG. 16a.

FIG. 17b is a schematic view illustrating an embodiment of the annular adjustment sleeve of FIG. 16a.

DETAILED DESCRIPTION

Figure 1:
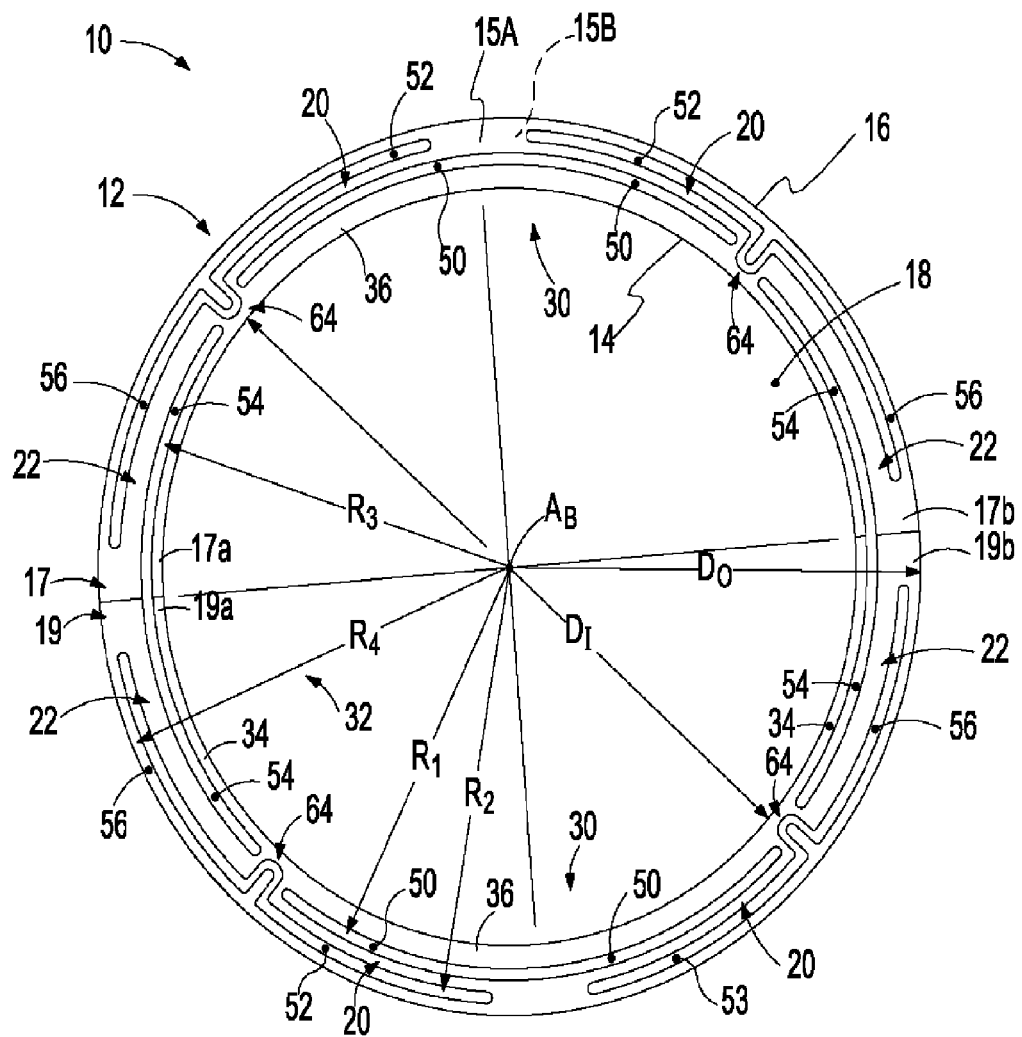
FIG. 1 is a front view illustrating an embodiment of a support device, in accordance with the disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

Referring now to the drawings in detail, wherein like numbers are used to indicate like elements throughout, there is shown in FIGS. 1-15 a support device 10 for a bearing assembly 1, the bearing assembly 1 including a housing 2 and bearing 3. The housing 2 has an inner circumferential surface 2a at least partially defining a central bore 4 and a centerline $L_H$ extending through the bore 4, and the bearing 3 has a bore 5 for receiving a shaft S rotatable about an axis $A_S$ and an outer circumferential surface 3a. The support device 10 includes a generally annular body 12 disposable within the housing bore 4 and having a central axis $A_B$, inner and outer circumferential surfaces 14, 16 extending about the axis $A_B$, and opposing radial or "side" surfaces 15A, 15B. The inner circumferential surface 14 defines a central bore 18 configured to receive the bearing 3 such that the support device 10 retains the bearing 3 positioned within the housing bore 4. Further, at least one first integral spring portion 20 extends generally between the inner and outer surfaces 14, 16 and has a first stiffness value $K_1$. Additionally, at least one second integral spring portion 22 is spaced circumferentially about the body axis $A_B$ from the at least one first spring 20, each second spring 22 also extending generally between the inner and outer surfaces 14, 16 and having a second stiffness value $K_2$. The second stiffness value $K_2$ can be substantially greater than the first stiffness value $K_1$, such that each first spring 20 has a substantially greater spring constant than each second spring 22.

Figure 3:
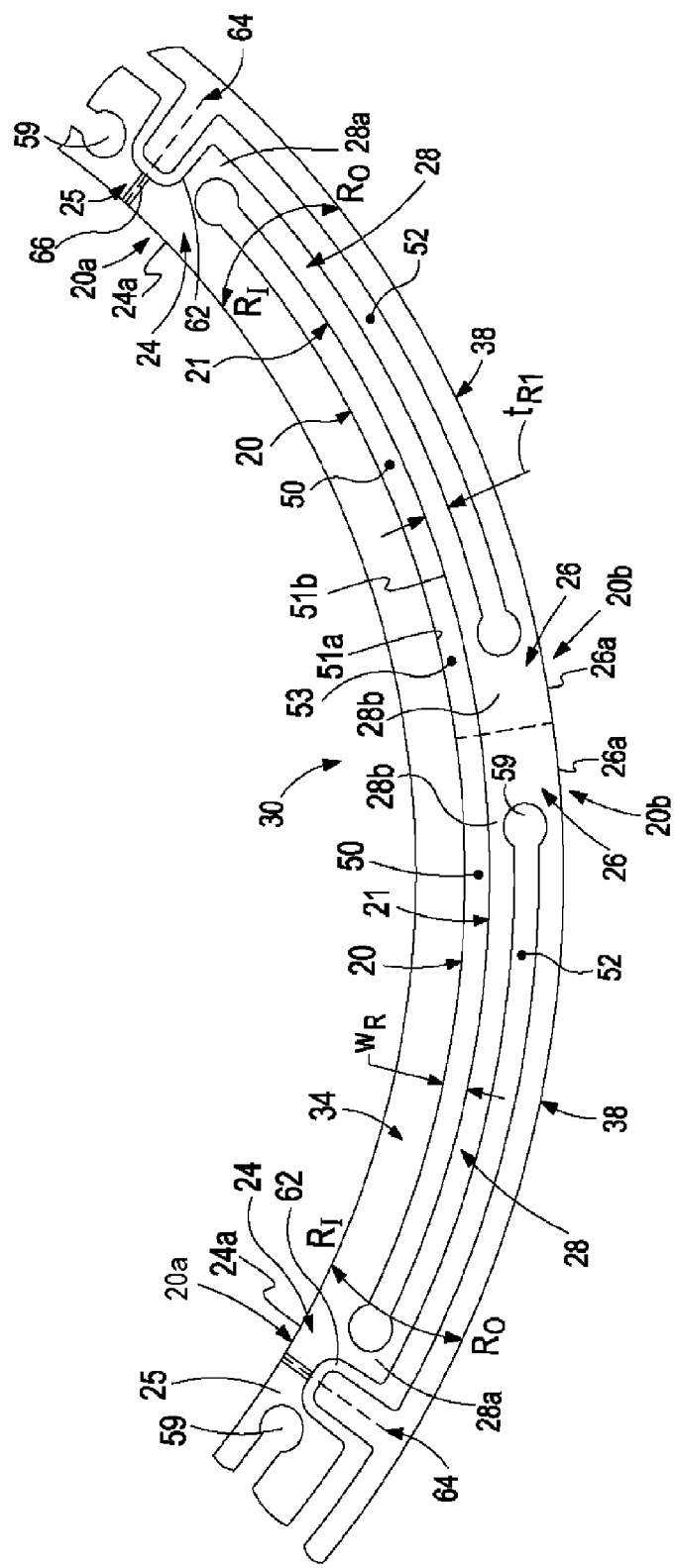
FIG. 3 is a partial front view illustrating an embodiment of the support device of FIG. 1.
Figure 4:
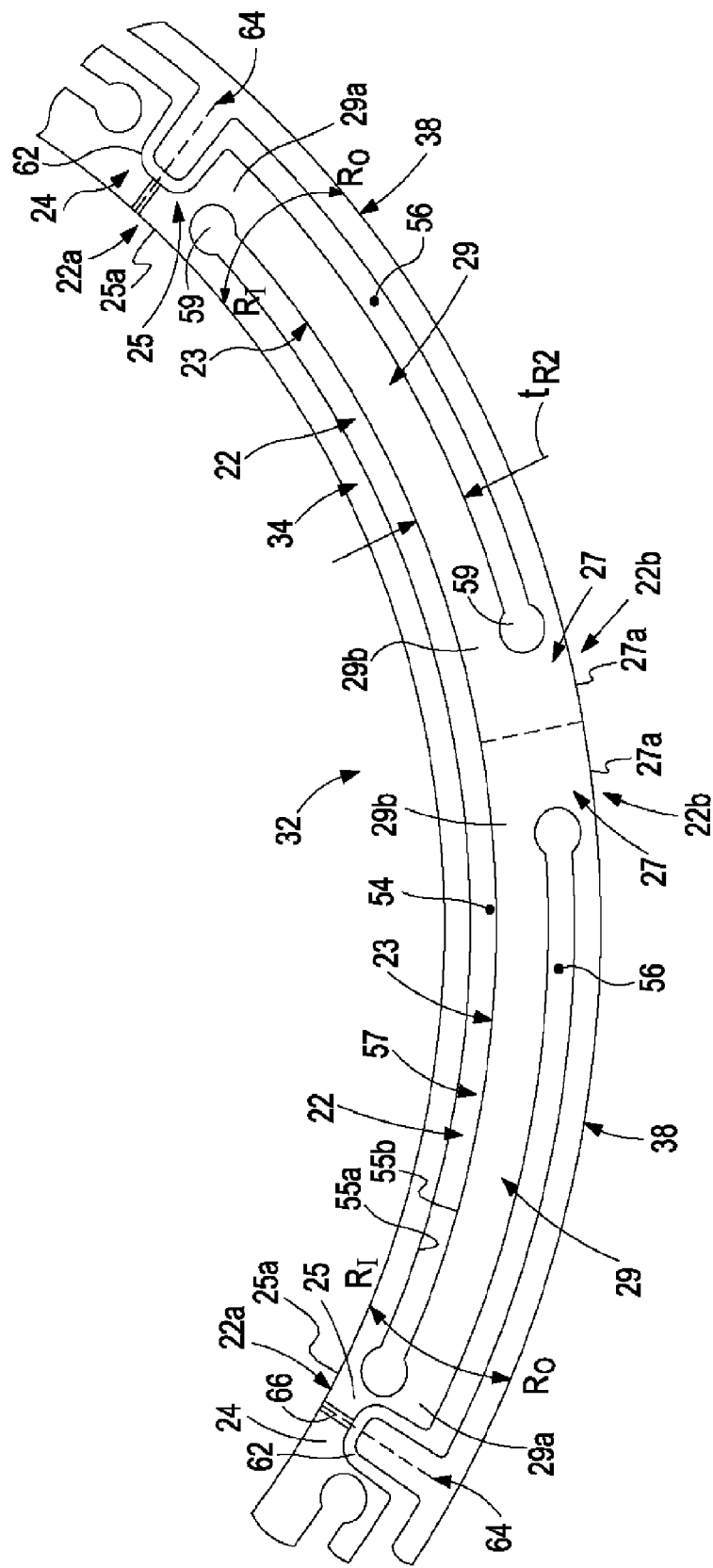
FIG. 4 is a partial front view illustrating an embodiment of the support device of FIG. 1.

Each one of the first and second springs 20, 22 includes a first end 20a, 22a generally contactable with the bearing outer surface 3a and a second end 20b, 22b generally contactable with the housing inner surface 2a. In at least one embodiment, each spring 20, 22 is a "cantilever" spring that includes a generally arcuate cantilever portion 21, 23, respectively, extending generally circumferentially with respect to the body axis $A_B$. Each spring cantilever portion 21, 23 is deflectable or bendable with respect to the body axis $A_B$ in generally radial directions $R_I$, $R_O$, as indicated in FIGS. 3 and 4. Further, each cantilever portion 21, 23 has a radial thickness $t_{R1}$, $t_{R2}$, the radial thickness $t_{R2}$ of each second spring cantilever portion 23 being substantially greater than the radial thickness $t_{R1}$ of each first spring cantilever portion 21, thus providing the greater stiffness of the second springs 22.

With the above structure, the body 12 is adjustably angularly positionable about the body axis $A_B$ to adjust a position of the shaft axis $A_S$ with respect to the housing centerline $L_H$ when the shaft S and bearing 3 are disposed within the support device 10, specifically the bore 18. In at least one embodiment, the housing inner circumferential surface 2a may extend at least partially eccentrically about the housing centerline $L_H$ such that the housing bore 4 is generally eccentric (i.e., about the centerline $L_H$) and the shaft S has a load F that exerts a net force on the bearing 3 generally along a radial line of force or "load line" $L_F$. Such a shaft load F includes the weight of the shaft S and of any components carried thereon (e.g., impellers, a separator, etc.), and may include horizontal or vertically-upward directed loading generated dynamically during turbomachine operation (e.g., exerted by a volute). The support device body 12 is angularly displaceable in opposing directions $C_1$, $C_2$ about the central axis $A_B$ to position the first and second springs 20, 22 with respect to the shaft S such that the load F deflects at least one of the first and second springs 20, 22 by a radial "deflection" distance $D_n$ in order to position the shaft axis $A_S$ generally collinearly with the housing centerline $L_H$.

In other words, the support body 12 may be angularly adjusted within the housing bore 4 until either the first spring(s) 20 or the second spring(s) 22 carry a greater portion of the load F than the other springs 22, 20, as necessary for the resultant deflection caused by the load F to "center" the shaft S within the housing 2. More specifically, the shaft S displaces a greater distance $d_S$ with respect to the housing 2 (e.g., downward vertically, laterally sideways, etc.) when the first spring(s) 20 are more proximal than the second spring(s) 22 to the load line $L_F$, as discussed further below. By being adjustable to accommodate different loading conditions, the support device 10 of the present invention may provide a "standard design" whereby the single support device 10 may be used in a variety of different applications, products, etc., and is capable of accommodating variations due to manufacturing tolerances in any particular application (e.g., a specific compressor model).

Having described the basic elements and function above, these and other components of the support device 10 and bearing assembly 1 of the present invention are described in greater detail below.

Figure 2:
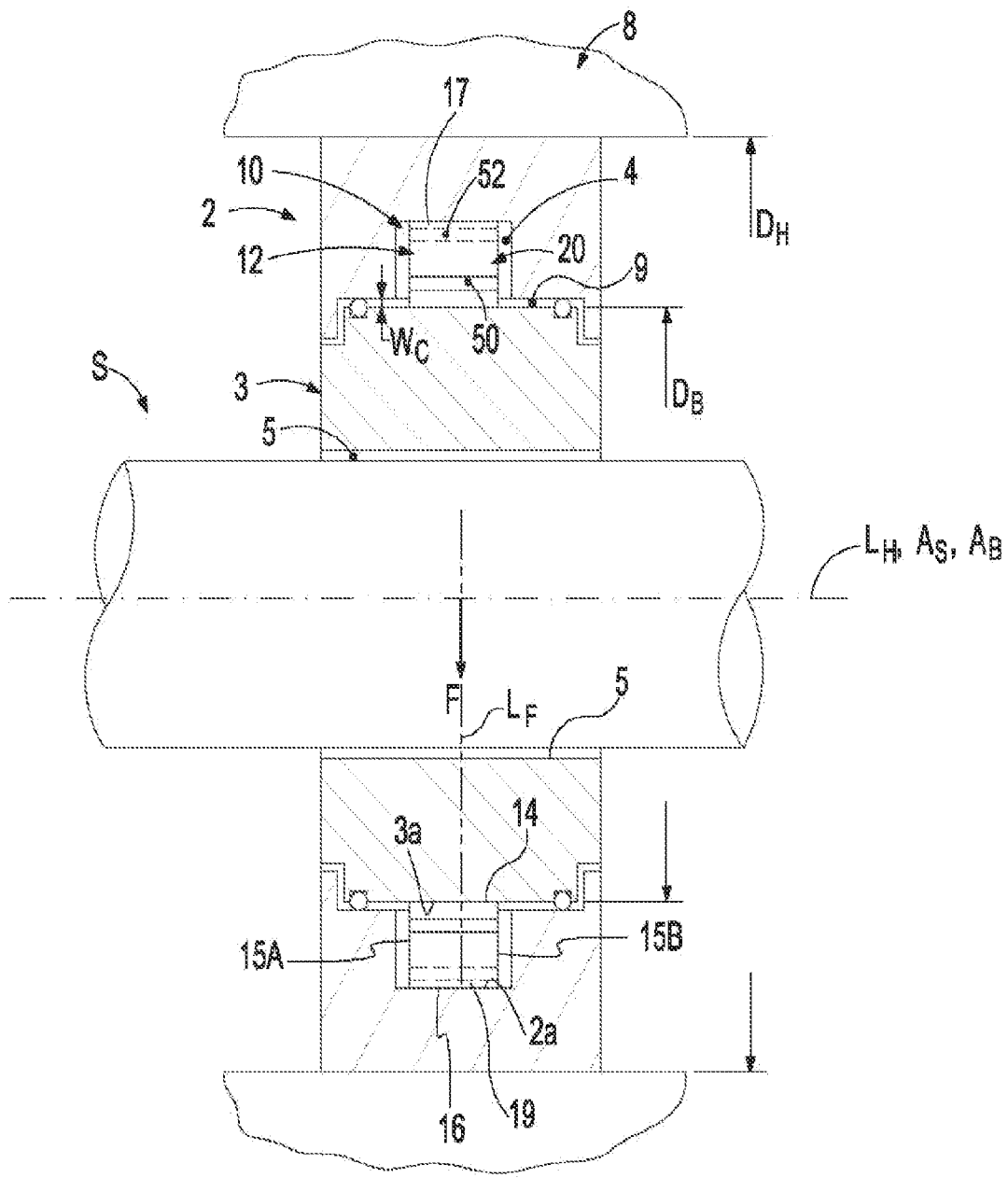
FIG. 2 is a partial cross-sectional side view illustrating an embodiment of the support device of FIG. 1 located in a bearing assembly and supporting a shaft.

Referring particularly to FIG. 2, the support device 10 may be used with a bearing assembly 1 that includes a squeeze film damper bearing 3. As such bearings are known and the specific bearing structure is not the subject of the present invention, the details of the preferred squeeze film bearing 3 are beyond the scope of the present disclosure. However, it must be noted that the support device 10 may be used with any type of bearing, such as for example, journal bearings, ball bearings, needle bearings, roller bearings, etc., of any appropriate size or configuration, as long as the support device 10 is capable of generally functioning as described herein. Further, although the housing 2 can be formed with an eccentric bore 4, the housing 2 may have a substantially circular bore, and may be formed in any appropriate manner that is capable of receiving the support device 10 and enabling the support device 10 to function as generally described herein. Additionally, the bearing assembly 1 can have an annular clearance space 9 between the bearing outside diameter DB and the housing inside diameter $D_H$ which is at least partially filled with a damping fluid (e.g., oil), as best shown in FIG. 2. The clearance space 9 has a radial width $w_C$ sized to provide a "squeeze film" damping action between the bearing 3 and the housing 2, which may be particularly beneficial as the preferred slotted openings (described below) of the support device 10 are typically too large/wide to generate squeeze film damping, as discussed below.

Figure 5:
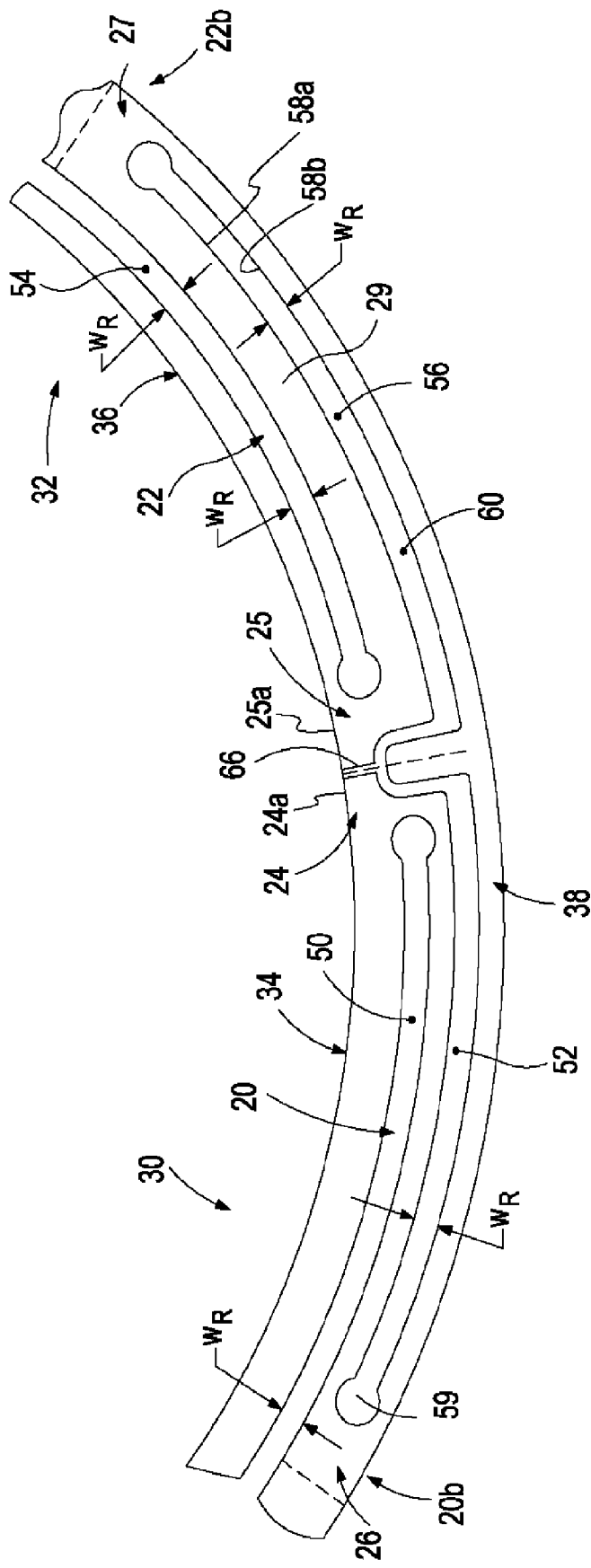
FIG. 5 is a partial front view illustrating an embodiment of the support device of FIG. 1.
Figure 6:
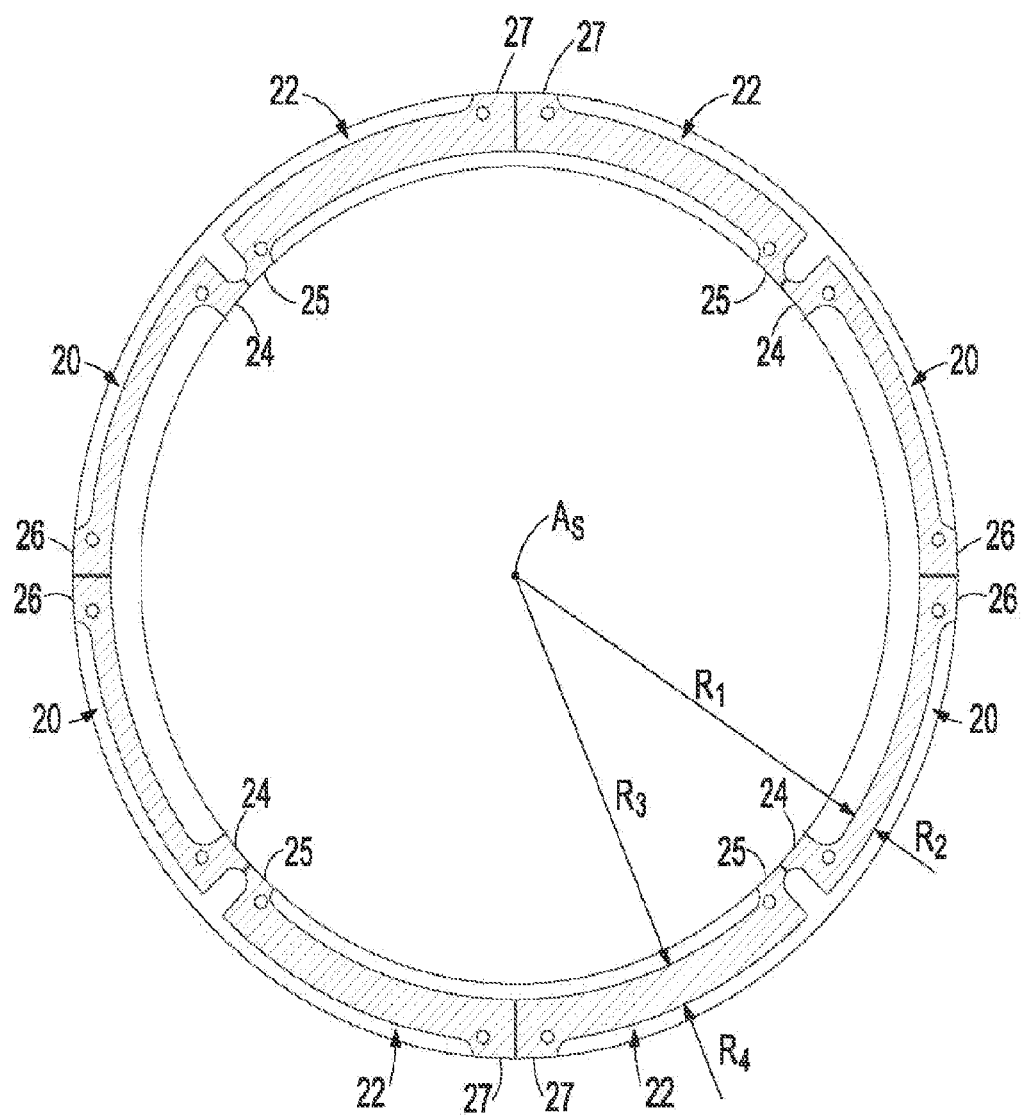
FIG. 6 is a front view illustrating an embodiment of the support device FIG. 1 that includes spring portions that have been shaded to indicate potential load paths through the support device.

Referring now to FIGS. 3-5, each of the first and second springs 20, 22 can include an inner support portion 24, 25, respectively, contactable with the bearing 3 and an outer base portion 26, 27, respectively, contactable with the housing 2. A central, elongated portion 28, 29 extends between each support portion 24, 25 and the associated base portions 26, 27, and provides the spring cantilever portion 21, 23, as discussed above. Each support portion 24, 25 is formed of a generally rectangular, inner section of the body 12 and has a surface 24a, 25a contactable with the bearing outer surface 3a. Further, each base portion 26, 27 is formed of a generally rectangular, outer section of the annular body 12 and has a surface 26a, 27a contactable with the housing inner surface 2a. Furthermore, the central or "cantilever" portion 28, 29 of each spring 20, 22 is formed of a generally arcuate, central section of the body 12 that extends generally circumferential about the body axis $A_B$. Each cantilever portion 28, 29 has a first end 28a, 29a integrally connected or formed with the associated support portion 24, 25 and a second end 28b, 29b integrally connected or formed with the associated base portion 26, 27. As discussed above, the cantilever portions 28, 29 are each deflectable about the connected base portion 26, 27, such that the support portion 24, 25 is generally displaceable in a radial direction with respect to the body axis $A_B$ in opposing directions $R_I$, $R_O$. In other words, each cantilever portion 28, 29 is bendable about a stationary base portion 26, 27 to move the cantilever "free" end 28a, 29a in the nature of a cantilever beam, to thereby displace the connected support portion 24, 25, and thus the bearing 3 and shaft S, as indicated in FIGS. 3, 4 and 9-14.

Furthermore, the support body 12 may also include at least two first spring portions 20 arranged such that the base portions 26 of the two springs 20 are integrally connected to form a first spring assembly 30. The cantilever portions 28 of the two connected first springs 20 can extend from the associated base portion 26 in opposing angular directions about the central axis $A_B$, such that each spring assembly 30 is generally T-shaped. In at least one embodiment, the support device 10 can include two first spring assemblies 30 spaced apart circumferentially about the body axis $A_B$ by about one hundred eighty degrees (180°). Similarly, the support body 12 may also include at least two second springs 22 with integrally connected base portions 27 and cantilever portions 29 extending in opposing angular directions, which form a generally T-shaped second spring assembly 32. As with the first spring assemblies 30, the support device 10 may also include at least two second spring assemblies 32, the two second spring assemblies 32 being spaced apart circumferentially about the body axis $A_B$ by about one hundred eighty degrees (180°), each second spring assembly 32 being generally spaced about ninety degrees (90°) apart from each one of the two first spring assemblies 30. Thus, the support device 10 can include two each of the first and second spring assemblies 30, 32 arranged so as to alternate circumferentially about the body axis $A_B$.

Figure 7:
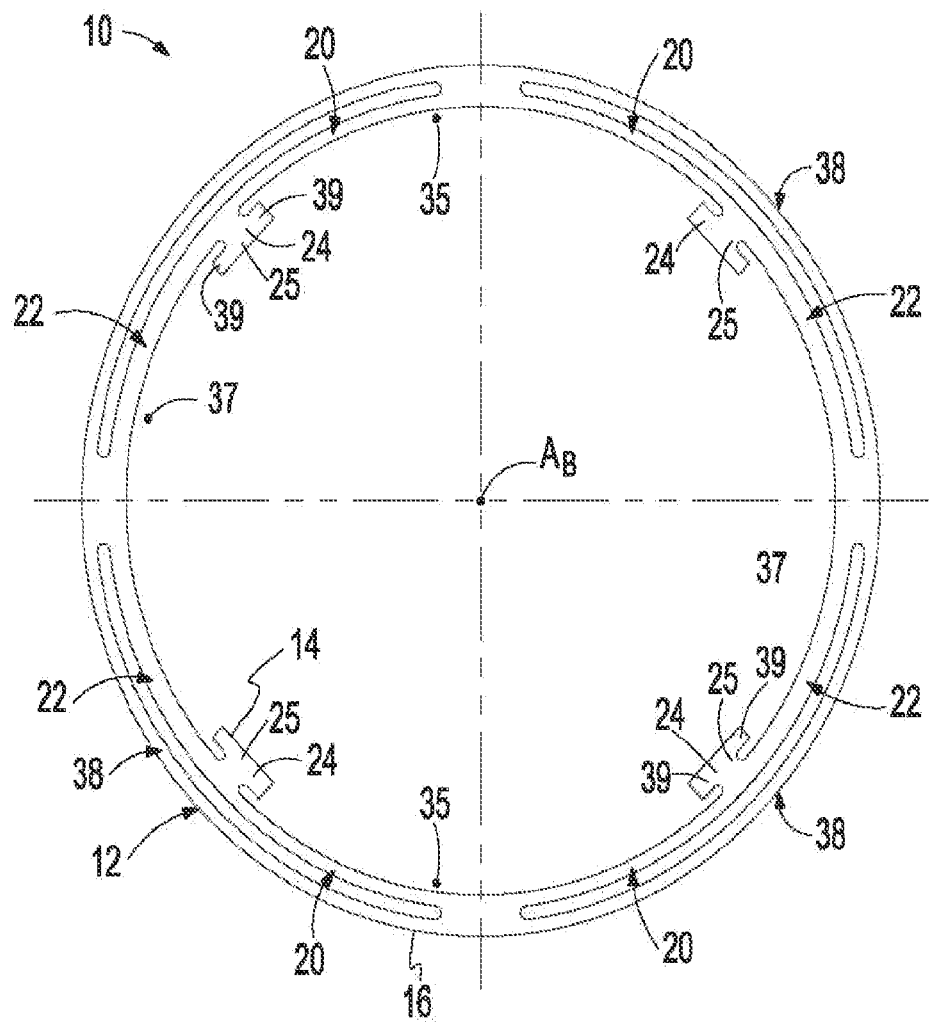
FIG. 7 is a front view illustrating an embodiment of an alternative construction of a support device.

Furthermore, the support portion 24 of each first spring 20 may be integrally formed with the support portion 25 of an adjacent second spring 22, and vice-versa, although the adjacent support portions 24, 25 may alternatively be separated by providing an appropriate slot or opening therebetween (not shown). In at least one embodiment, the support body 12 may further include a plurality of generally arcuate, inner connector portions 34 each extending between the two first spring support portions 24 of each first spring assembly 30. Additionally, one or more other arcuate inner connector portions 36 may each extend between the two second spring support portions 25 of each second spring assembly 32. As such, with the integrally formed adjacent support portions 24 and 25 and the integral connector portions 34, 36, the body inner surface 14 can be substantially continuous about the body axis $A_B$, such that the load F transferred from the bearing 3 to the support device 10 is distributed across a relatively large area, thereby reducing localized stresses. However, as shown in FIG. 7, the support body 12 may be formed such that a generally arcuate recess 35 extends radially outward from the body inner surface 14 and between the two support portions 24 of each first spring assembly 30, and another generally arcuate recess 37 extends radially outward from the body inner surface 14 and between the two support portions 25 of each second spring assembly 32. In such an alternative design, the overall weight of the support device 10 is reduced, but stresses may be concentrated at the first and second support portions 24, 25, which may be partially alleviated by providing extensions 39 to increase the support portion contact area.

Figure 8:
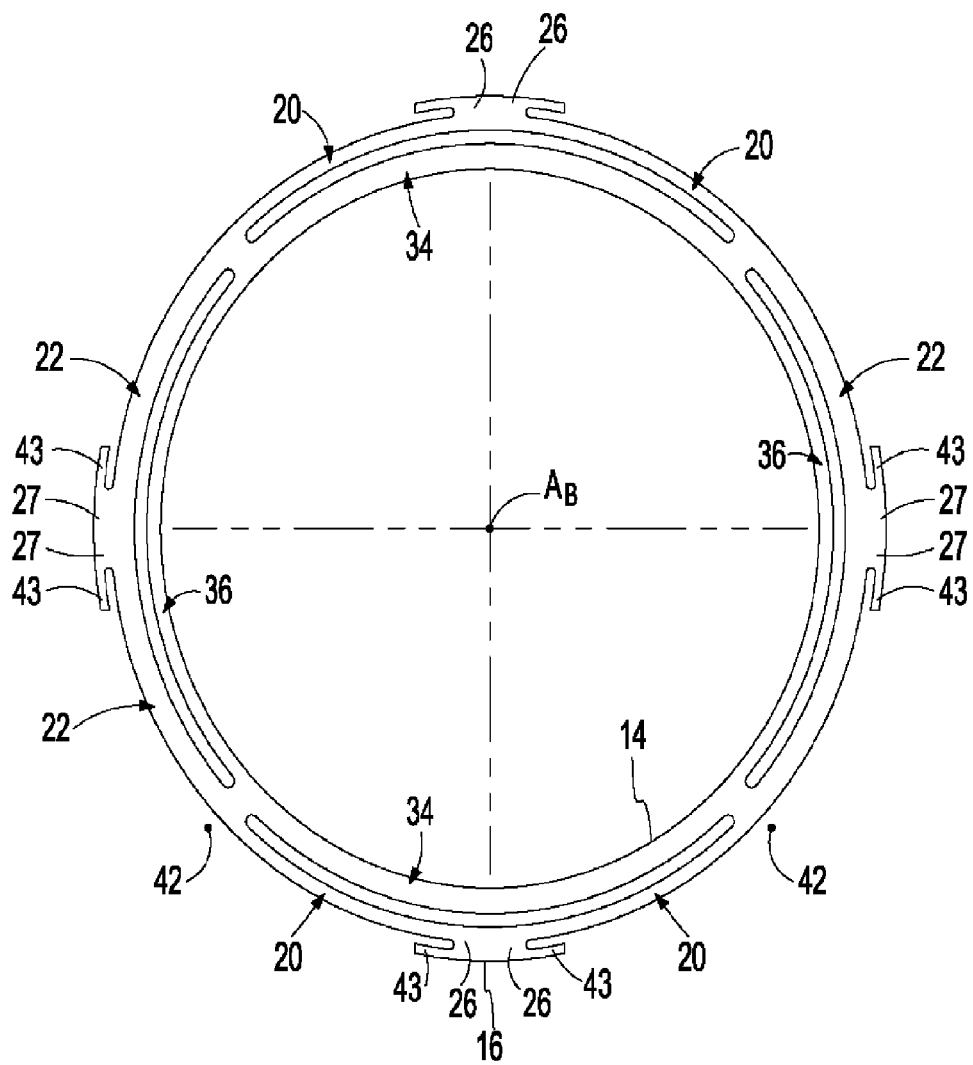
FIG. 8 is a front view illustrating an embodiment of an alternative construction of a support device.

Furthermore, the support body 12 may further have a plurality of generally arcuate, outer connector portions 38 each extending between one first spring base portion 26 and the base portion 27 of the adjacent second spring 22, and vice versa. Such outer connector portions 38 enable the body outer surface 16 to be substantially continuous and distribute the load F from the support device 10 to the housing 2 across a relatively large contact area, thereby minimizing stress concentration. However, as shown in FIG. 8, the support device 10 may also be formed with a plurality of generally arcuate recesses 42, which each extend radially inward from the body outer surface 16 and circumferentially between pairs of adjacent first and second spring base portions 26, 27. As with the inner recesses 35 and 37, the outer recesses 42 reduce weight, but may increase stress concentration, such that the spring base portions 26, 27 may be provided with extensions 43 to increase the base portion contact area. Further, the inner and outer recesses 35, 37 and 42 may be formed by any appropriate method, such as milling or otherwise machining between the integral support portions 24, 25 and/or base portions 26, 27, or by casting or otherwise forming the support body 12 with inwardly-projecting support portions 24, 25 and/or outwardly-projecting base portions 26, 27.

Referring now to FIGS. 1 and 3-5, the integral cantilever springs 20 and 22 may be formed by providing a plurality of slotted openings in the support body 12. More specifically, the support body 12 can include at least one, and possibly four, first arcuate slotted openings 50 and at least one, and possibly four, second arcuate slotted opening 52. Each of the first and second slotted openings 50, 52 may extend axially between the radial surfaces 15A, 15B and have a central radius $R_1$, $R_2$, respectively, about the body axis $A_B$. Further, the second opening radius $R_2$ may be greater than the first opening radius $R_1$ and each second opening 52 is spaced radially outward from one of the first openings 50, such that the cantilever portion 28 of one first spring 20 is at least partially defined between each proximal pair of first and second openings 50, 52. In at least one embodiment, the four first slotted openings 50 may be arranged in two pairs, with each pair of openings 50 being defined by two facing circumferential surfaces 51a, 51b that form a single, relatively long continuous slot 53, but may alternatively be provided by two separate openings 50 (not shown).

Furthermore, the body 12 may also include at least one, and possibly four, third arcuate slotted openings 54 and at least one, and possibly four, fourth arcuate slotted openings 56. Each slotted opening 54, 56 can extend axially between the body radial surfaces 15A, 15B, and has a central radius $R_3$, $R_4$ about the body axis $A_B$. The fourth opening radius $R_4$ is greater than the third opening radius $R_3$, and the fourth opening 56 is spaced radially outward from the third opening 54 such that the cantilever portion 29 of one second spring 22 is at least partially defined between the third and fourth openings 54, 56. In at least one embodiment, the four third slotted openings 54 may be arranged in two pairs, with each pair of openings 54 being defined by two facing circumferential surfaces 55a, 55b that form a single, relatively long continuous slot 57, but may alternatively be provided as completely separate openings 54, 56 (not shown).

Further, each pair of third and fourth openings 54, 56 may be spaced circumferentially from each pair of first and second openings 50, 52, such that the four pairs of openings 50/52 and 54/56 alternate circumferentially about the body axis $A_B$. Furthermore, each first radius 50 can be greater than each third radius 54, or alternatively each fourth radius 56 can be greater than each second radius 52, such that the second spring cantilever portion 29 has a radial thickness $t_{R2}$ that is substantially greater than a radial thickness $t_{R1}$ of the first spring cantilever portion 28, as discussed above. As such, each second spring 22 has greater stiffness, and thus deflects a lesser distance for a given load F, as compared with each first spring 20, as described above and in further detail below.

Additionally, each fourth opening radius $R_4$ may be generally equal to each second opening radius $R_2$ and the second and fourth openings 52, 56 can be both generally defined by a single pair of facing circumferential surfaces 58a, 58b. In other words, each second and fourth openings 52, 56 may be provided by a single, relatively long slot 60, although the two openings 52, 56 may be formed as separate openings (not shown). In an exemplary embodiment, each slot 60 (and thus the surfaces 58a, 58b defining the slot 60) has a central, radially inward off-set section 62 connecting the associated second and fourth openings 52, 56 and forming a generally "U-shaped" hinge 64 between adjacent first and second springs 20, 22. Each hinge 62 is configured to enable relative circumferential movement of the adjacent pairs of springs 20, 22, thereby facilitating generally radial movement of each spring cantilever portion 21 or 23. Furthermore, the body 12 may also include a generally radial slotted opening 66 extending from the body inner surface 14 to each slot offset section 62, such that each adjacent pair of springs 20, 22 is unconnected, as shown in FIGS. 3-5. As such, the radial slots 66 may each further increase the capability of relative movement between adjacent springs 20, 22. However, the body 12 may alternatively be provided with semi-circular openings or "scallops" each disposed generally central in a separate one of the preferred outer slots 60, to function essentially as a hinge, or the slots 60 may be formed without any hinge or scallops (neither shown).

Referring particularly to FIG. 5, each one of the first, second, third and fourth slotted openings 50, 52, 54 and 56 may be formed with a radial width $w_R$ of at least five thousandths of an inch (0.005"), or of at least ten thousandths of an inch (0.010"), to provide sufficient clearance for the springs 20, 22 to deflect without "bottoming out". However, with slot radial widths $w_R$ of such magnitude, the ability of the support device 10 to provide damping is negligible, particularly in comparison to the damping action provided in the annular clearance space 9 between the bearing 3 and housing 2, as discussed above. As such, each slotted opening 50, 52, 54 and 56 may be formed with a radial width $w_R$ of at least twenty thousandths of an inch (0.020") and even thirty thousandths of an inch (0.030") or greater. With smaller size bearings 3, the support device 10 may have slotted openings 50, 52, 54 and 56 formed by a wire EDM process, or any other precision cutting process, and when used with larger diameter bearings 3, the openings 50, 52, 54, 56 may be formed by another process, such as milling. Further, the slotted openings 50, 52, 54 and 56 may be formed so as to include enlarged end portions 59, as shown in FIGS. 3-5, which both serve to provide an opening for feeding EDM wire during fabrication and to reduce stress concentration. Additionally, the support device 10 may further comprise a polymeric or rubber material (not depicted) disposed within at least one of the slotted openings 50, 52, 54 or 56 so as to provide damping of the device 10.

Figure 15:
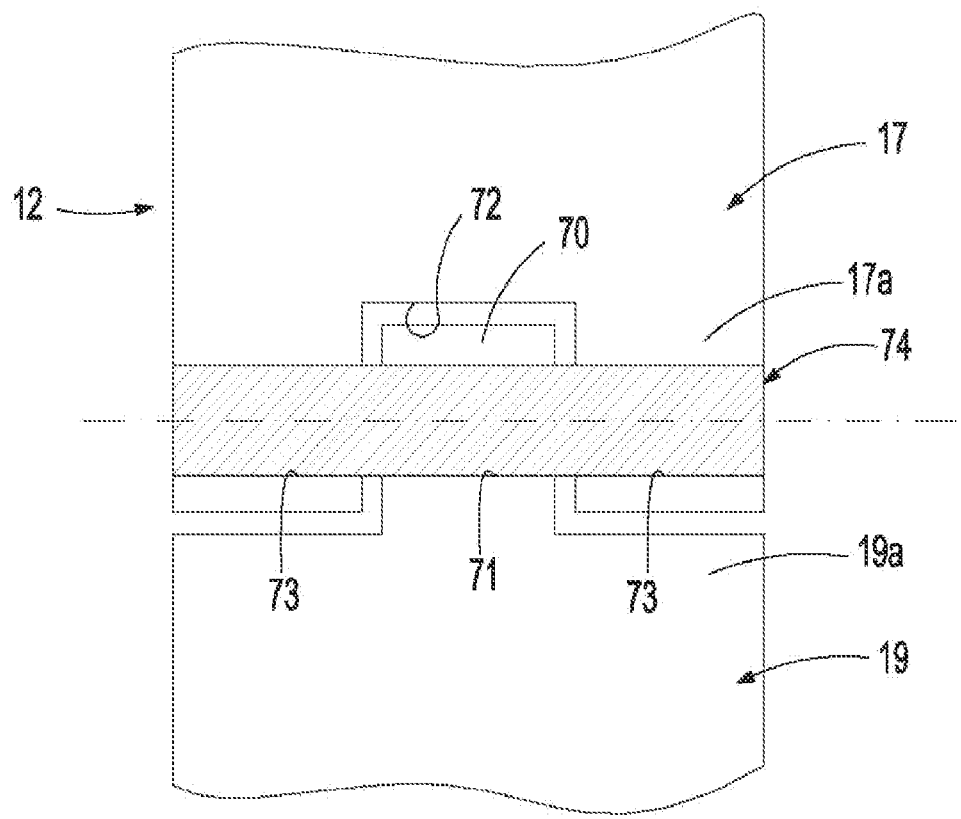
FIG. 15 is a cross-sectional side view illustrating an embodiment of an annular body of the support device of FIG. 1.

Referring to FIGS. 1, 2 and 15, the annular body 12 may be "horizontally split" or formed of upper and lower semi-circular ring halves 17, 19 assembled together to form the overall body 12, as indicated in FIG. 1, so as to facilitate installment of the support device 10 within the bearing assembly 1. As best shown in FIG. 15, each ring half 17, 19 has two opposing ends 17a, 17b and 19a, 19b, respectively, disposable against a corresponding end of the other ring half 19, 17 to form abutting ring end pairs 17a/19a and 17b/19b. In at least one embodiment, one end of each pair 17a/19a and 17b/19b has a lug 70 with a through hole 71 and the other end of each pair 17a/19a and 17b/19b has a pocket 72 configured to receive the lug 70 and having aligned holes 73. The support device 10 may further have two pins 74 each disposable within one of the sets of aligned holes 71 and 73 so as to retain each lug 70 within each pocket 72, thereby releasably connecting the two ring halves 17, 19. However, the support body 12 may alternatively be formed as a single, integral circular ring, two "vertically split" semi-circular ring halves, three or more separate arcuate segments assembled together to form the body 12, etc. (none shown).

In an exemplary embodiment, the support body 12 may have an inside diameter $D_I$ sized lesser than the bearing outside diameter $D_B$ and an outside diameter $D_O$ sized greater than the housing bore inside diameter $D_H$, as indicated in FIG. 2. As such, the support inner surface 14 and bearing outer surface 3a can engage with a friction fit, and the support outer surface 16 and housing inner surface 2a can also engage with a friction fit. With such engagement of support device surfaces 14, 16 and bearing and housing surfaces 3a, 2a, fretting of the support device 10 is minimized, and possibly eliminated. However, the support device 10 may be engaged with the bearing 3 and/or housing 2 by any appropriate means, such as via threaded fasteners, keys, etc. Additionally, the support device body 12 may be fixable within the housing 2 by appropriate means, for example by doweling, so as to retain the angular position of the support device 10 about the housing centerline $C_H$.

Referring to FIG. 2, prior to use, the bearing assembly 1 with the support device 10 of the present invention may be assembled generally in the following manner. The bearing 3 is mounted within the central bore 18 of the support device 10, and the support device 10 is mounted within the housing bore 4. Initially, the support body 12 is not fixed within the housing 2, so as to enable angular adjustment thereof, as discussed below. Further, the bearing assembly 1 is then mounted about the shaft S such that the shaft S extends through the bearing bore 5, either by directly assembling the bearing assembly 1 upon the shaft S or by mounting the bearing assembly 1 within a turbomachine casing 8 (FIG. 2) and then inserting the shaft S through the bearing bore 5.

Figure 9:
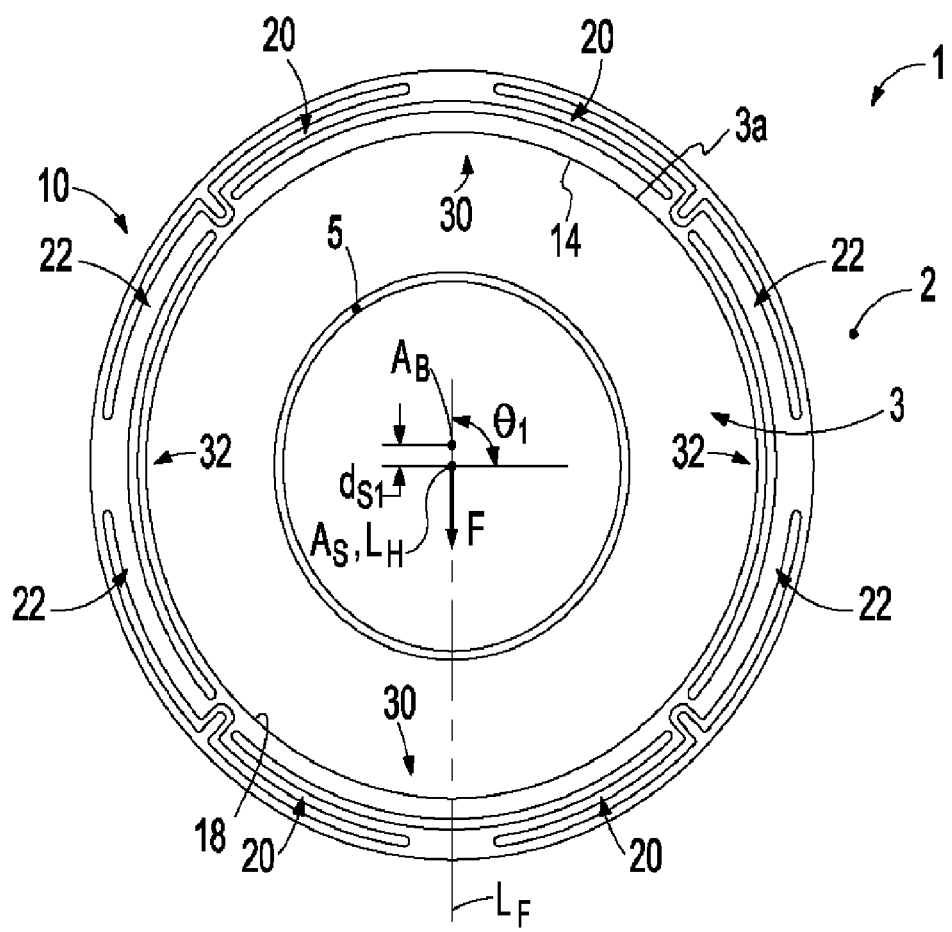
FIG. 9 is a front view illustrating an embodiment of the support device of FIG. 1 being used in a bearing assembly and in a first position about a body axis.
Figure 10:
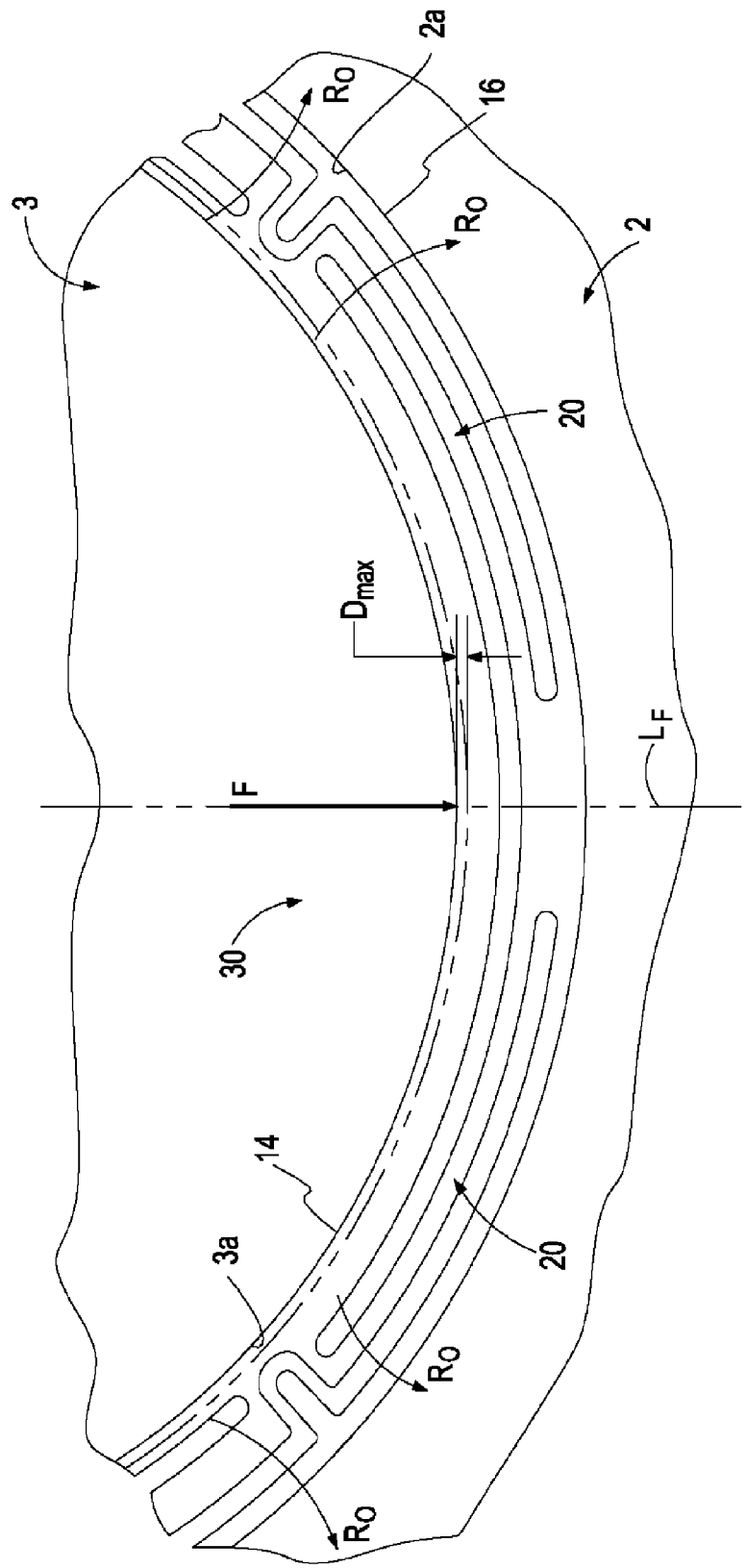
FIG. 10 is a partial view illustrating an embodiment of a portion of the support device of FIG. 9.
Figure 11:
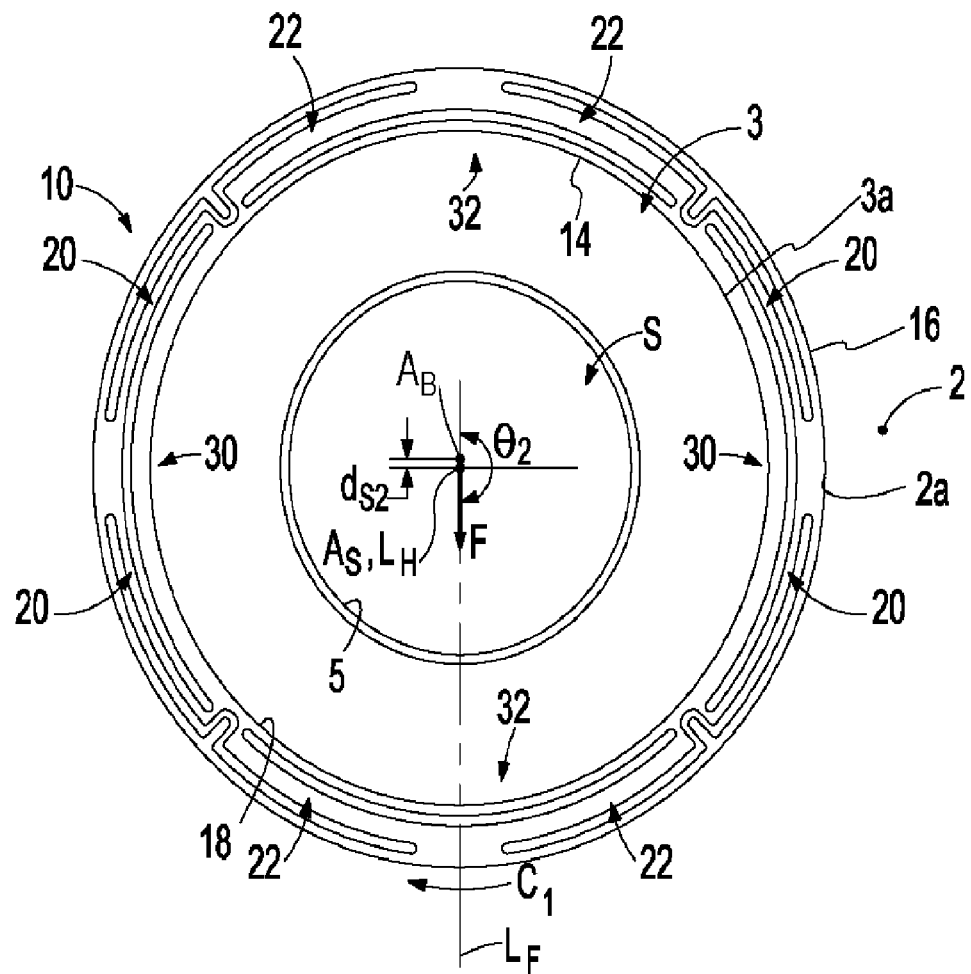
FIG. 11 is a front view illustrating an embodiment of the support device of FIG. 1 being used in a bearing assembly and in a second position about a body axis.
Figure 12:
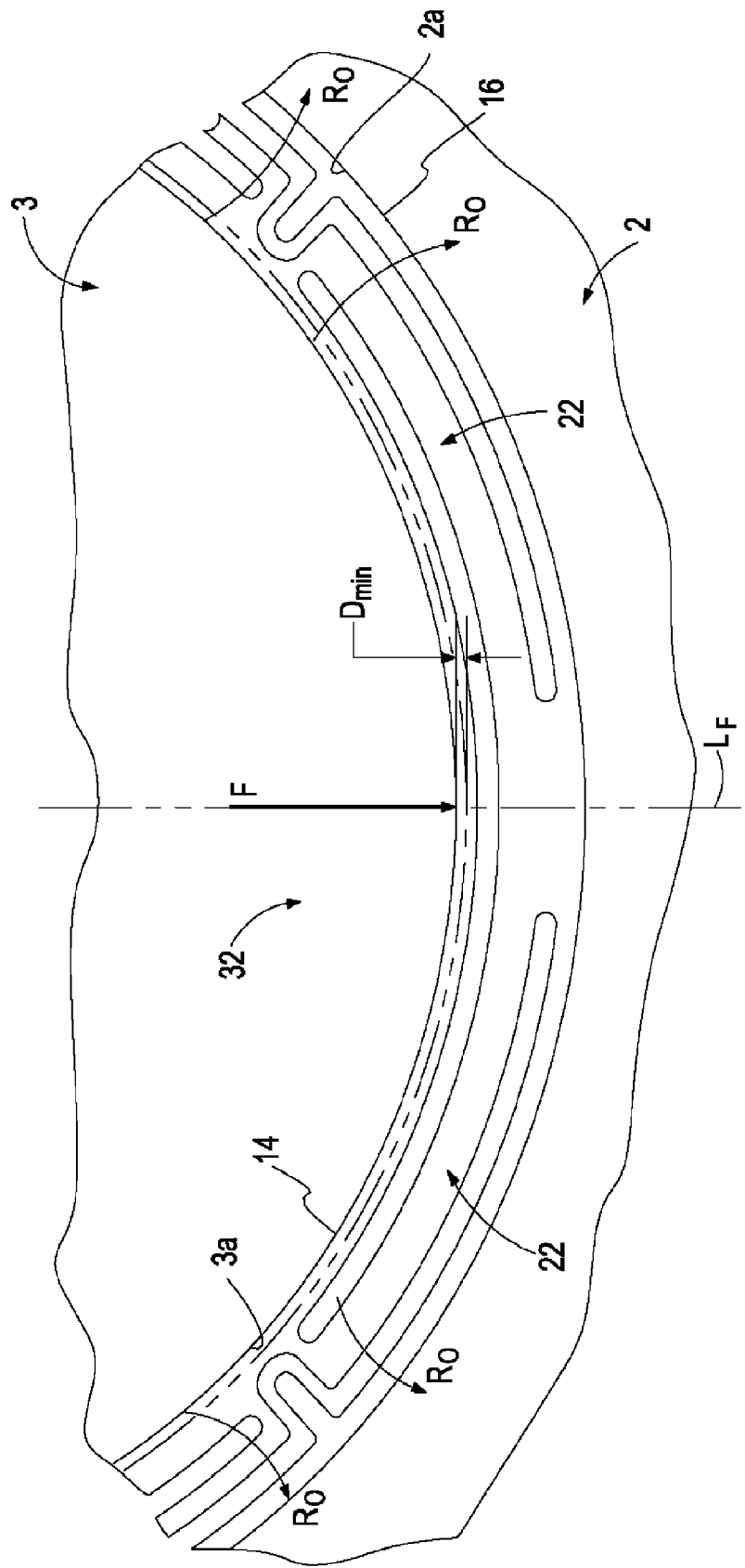
FIG. 12 is a partial view illustrating an embodiment of a portion of the support device of FIG. 11.

In either case, the support device 10 may be adjusted to accommodate the specific shaft loading conditions, as follows. When the magnitude of the load force F is relatively lesser and/or the eccentricity of the housing bore 4 is relatively greater, the support body 12 may be positioned about the housing centerline $L_H$ or shaft axis $A_S$, for example at a "first" angular position $\theta_1$, such that one of the two first spring assemblies 30 is generally centered upon the load line $L_L$, as shown in FIGS. 9 and 10. It must be noted that, as discussed herein, the designation of any particular angular position $\theta_n$ as "first", "second", etc. is solely for convenience of discussion only, and the support device 10 may be assembled in the bearing assembly 1 at any particular first or initial position, and may be displaced or rotated therefrom as necessary to "center" the shaft S. In the first position described above and shown in FIGS. 9 and 10, a given load F will cause the greatest amount of deflection $D_{MAX}$ of the support device 10, which may permit the shaft S to displace by a distance $d_{S1}$ sufficient to position the shaft axis $A_S$ generally collinear with the housing centerline $L_H$. When the load force magnitude is relatively greater and/or the eccentricity of the housing bore 4 is relatively lesser, the support body 12 may be adjusted about the housing centerline $L_H$/shaft axis $A_S$, for example rotated in a direction $C_1$ to a second angular position $\theta_2$, such that one of the two second spring assemblies 32 is generally centered upon the load line $L_L$, as shown in FIGS. 11 and 12. In this arrangement, a particular load F will cause the least amount of deflection $D_{MIN}$ of the support device 10, but nonetheless enables the shaft S to displace a sufficient distance $d_{S2}$ to position the shaft axis $A_S$ generally collinearly with the housing centerline $L_H$.

Figure 13:
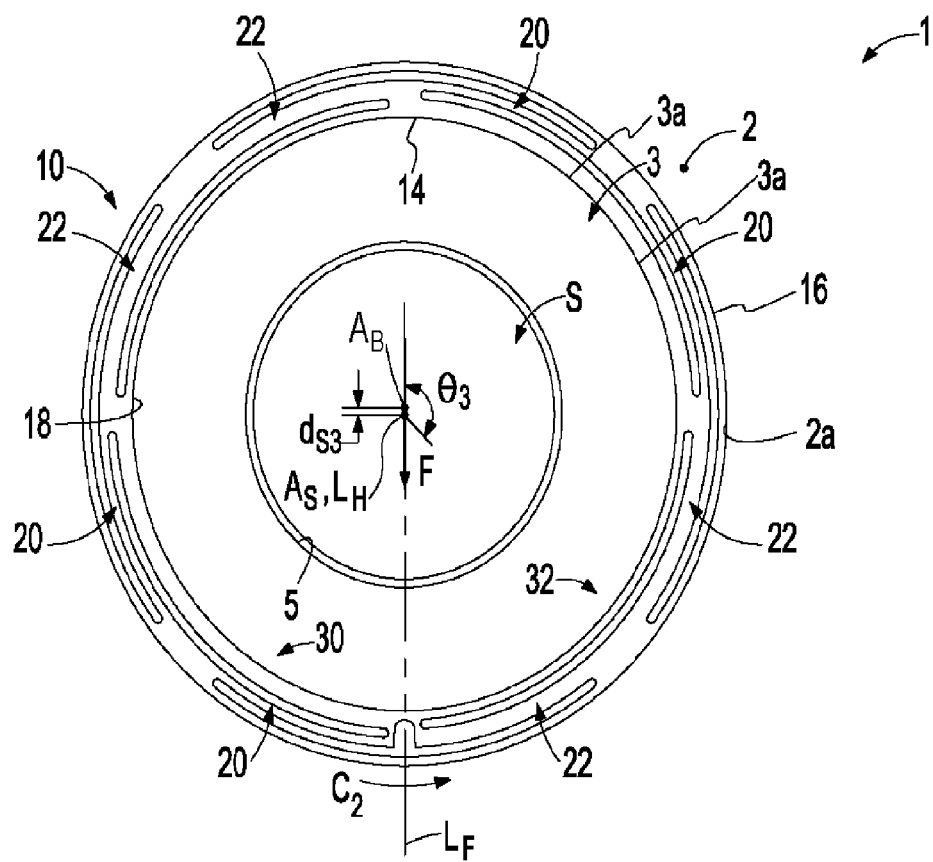
FIG. 13 is an front view illustrating an embodiment of the support device of FIG. 1 being used in a bearing assembly and in a third, intermediate, position about a body axis.
Figure 14:
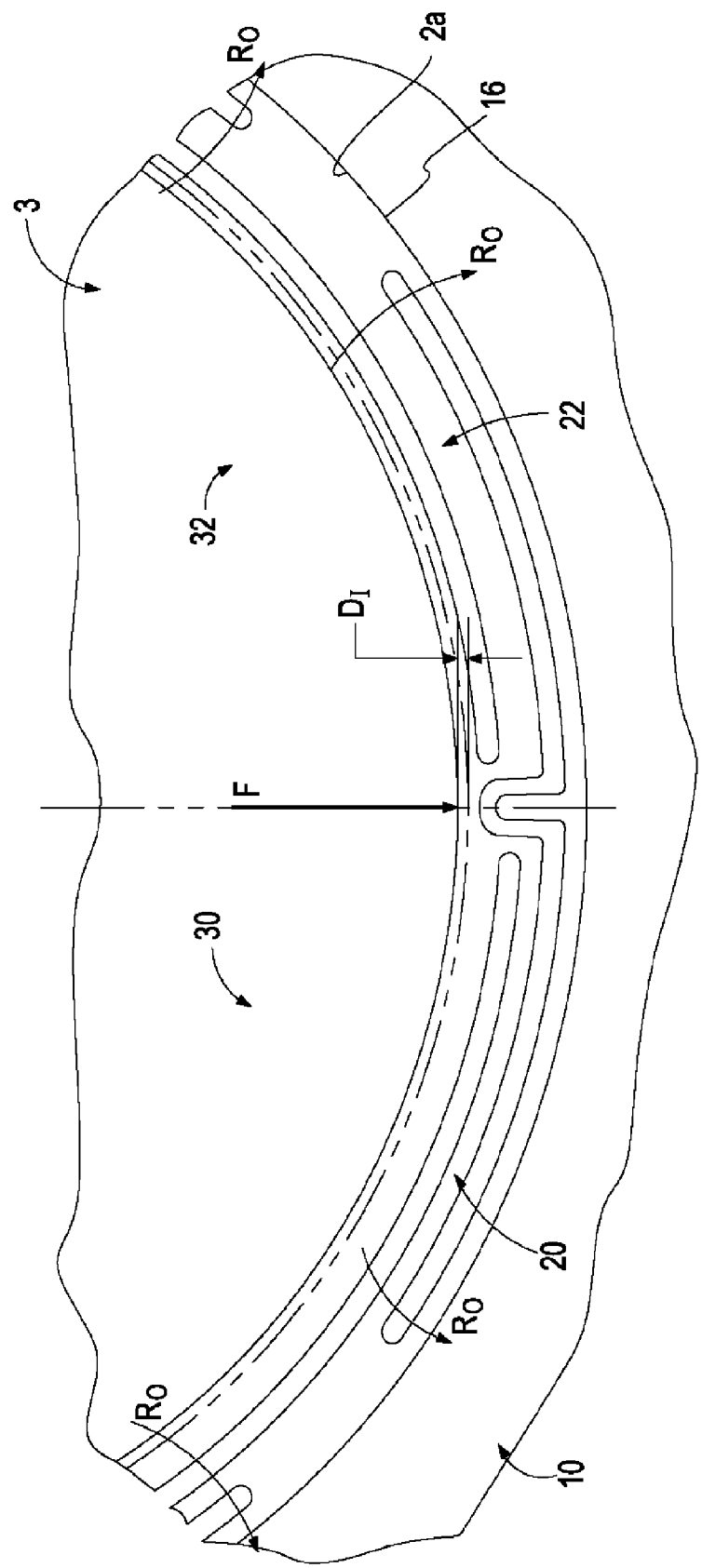
FIG. 14 is a partial view illustrating an embodiment of a portion of the support device of FIG. 13.

Furthermore, the support body 12 may be positioned at any other angular location about the housing centerline $L_H$ or shaft axis $A_S$, for example rotated in an opposing direction $C_2$ to an angular position $\theta_3$, to provide a support device deflection $D_I$ between the limits $D_{MIN}$ and $D_{MAX}$ depending on the magnitude of the load F, the specific orientation of the load line $L_L$, and/or the housing eccentricity. For example, the support device 10 may be positioned such that the load line $L_L$ extends generally equidistant between one first spring assembly 30 and an adjacent second spring assembly 32, as depicted in FIGS. 13 and 14, such that the load F is generally shared by at least part of the two spring assemblies 30, 32. In any case, the amount of support member deflection $D_n$, and thus shaft displacement $d_{Sn}$, is relatively greater when one or more first springs 20 support a greater portion of the load F and relatively lesser when one or more second springs 22 support a greater portion of the load F. Further, although the load F is depicted in FIGS. 9-14 as acting along a generally vertical line $L_L$, the actual net load F on the shaft 2 may act along a line $L_L$ that is substantially horizontal, vertically-upward, or at any angle between horizontal and vertical (none depicted). In any case, once the support device 10 has been adjusted to a desired angular position $\theta_n$, the support body 12 can be retained at a fixed position within the bearing housing 2 by means of one or more dowels.

A system will now be described that may be utilized to support and adjust the position of a bearing assembly supporting a shaft. The system has a first annular body having an 'eccentric bore' defined therein and a second annular body having an 'eccentric bore' defined therein. The first annular body is mounted in the eccentric bore of the second annular body so that the first and second annular bodies are rotatable relative to one another. The first and second annular bodies may then be rotated relative to one another to adjust the position of the bearing assembly and, in turn, the centerline of the shaft that is positioned in the bearing assembly. The system may prove advantageous in correcting the position of the shaft which may be deflected from a desired centerline due to the weight of the shaft, allowing the centerline of a shaft to be moved to be co-linear with the desired centerline. The system may be mounted directly on a shaft. However, as shown in the embodiments disclosed herein, the system may be disposed around a bearing that supports a shaft, so that the bearing rides in the eccentric bore of the first body. In one embodiment, the first body is a sleeve and the second body is a spring. The eccentricities of the two bores can be selected so that relative rotation of the two bodies through the same angular rotation in opposite directions results in movement of the axis of the eccentric bore of the first body in a straight line relative to the perimeter of the second body. Since the axis of the eccentric bore of the first body and the shaft extending therethrough are co-linear, the position of the shaft can thus be adjusted along a straight line.

Figure 16A:
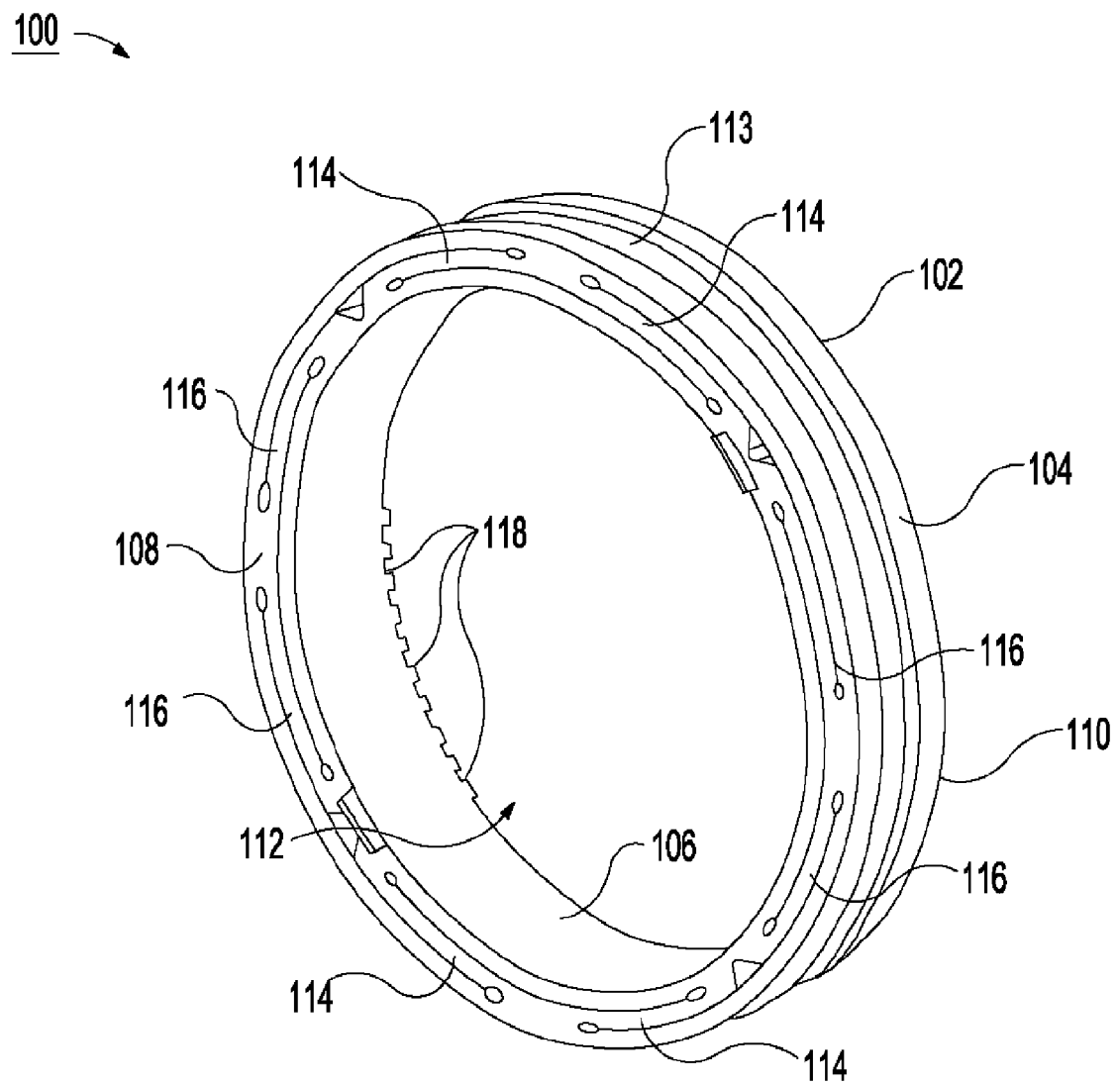
FIG. 16a is a perspective view illustrating an embodiment of an annular support device.
Figure 16B:
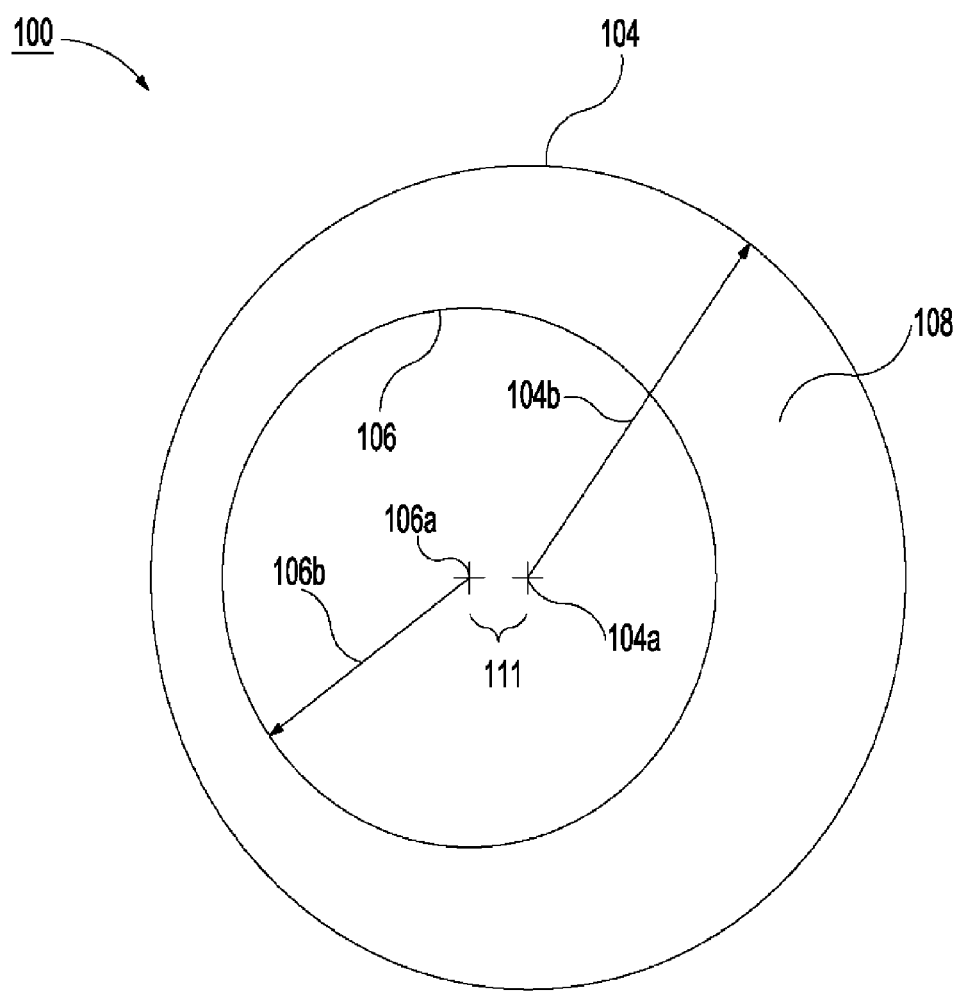

Referring now to FIGS. 16a and 16b, an exemplary annular support device 100 is illustrated. In an embodiment, the annular support device 100 may include some or all of the features of the support device 10, described above with reference to FIGS. 1-15. The annular support device 100 can include an annular body 102 (which may be the annular body 12, described above) having a support device outer circumferential surface 104 (which may be the outer circumferential surface 16, described above), a support device inner circumferential surface 106 (which may be the inner circumferential surface 14, described above) that is located on the annular body 102 opposite the support device outer circumferential surface 104, and a pair of opposing side surfaces 108 and 110 (which may be the opposing radial or "side" surfaces 15A and 15B, described above) that extend between the support device outer circumferential surface 104 and the support device inner circumferential surface 106. As illustrated in the schematic view of the annular support device 100 in FIG. 16b, the support device outer circumferential surface 104 can be located about a first axis 104a such that points on the support device outer circumferential surface 104 are generally located a distance 104b from the first axis 104a, and the support device inner circumferential surface 106 can be located about a second axis 106a such that points on the support device inner circumferential surface 106 are generally located a distance 106b from the second axis 106a. The second axis 106a can spaced apart from the first axis 104a by a distance 111 (the distances 104b, 106b and 111 have been greatly exaggerated in the schematic view of FIG. 16b for purposes of discussion and illustration). The support device inner circumferential surface 106 defines a support device bore 112 (which may be the central bore 18, described above) that shares the second axis 106a with the support device inner circumferential surface 106. A clamp channel 113 is defined by the annular body 102 and extends into the annular body 102 from a substantially central location on the support device outer circumferential surface 104. A plurality of first spring portions 114 (which may be the first integral spring portions 20, described above) are each located generally between the support device outer circumferential surface 104 and the support device inner circumferential surface 106. A plurality of second spring portions 116 (which may be the second integral spring portions 22, described above) are each located generally between the support device outer circumferential surface 104 and the support device inner circumferential surface 106. A plurality of support device index slots 118 are defined by the annular body 102 and located adjacent the support device inner circumferential surface 106 and the side surface 110. While only a few similar features shared by the annular support device 100 and the support device 10 have been pointed out for clarity, as previously stated, the annular support device 100 may include some or all of the features of the support device 10 as they are described above with reference to FIGS. 1-15.

Figure 17A:
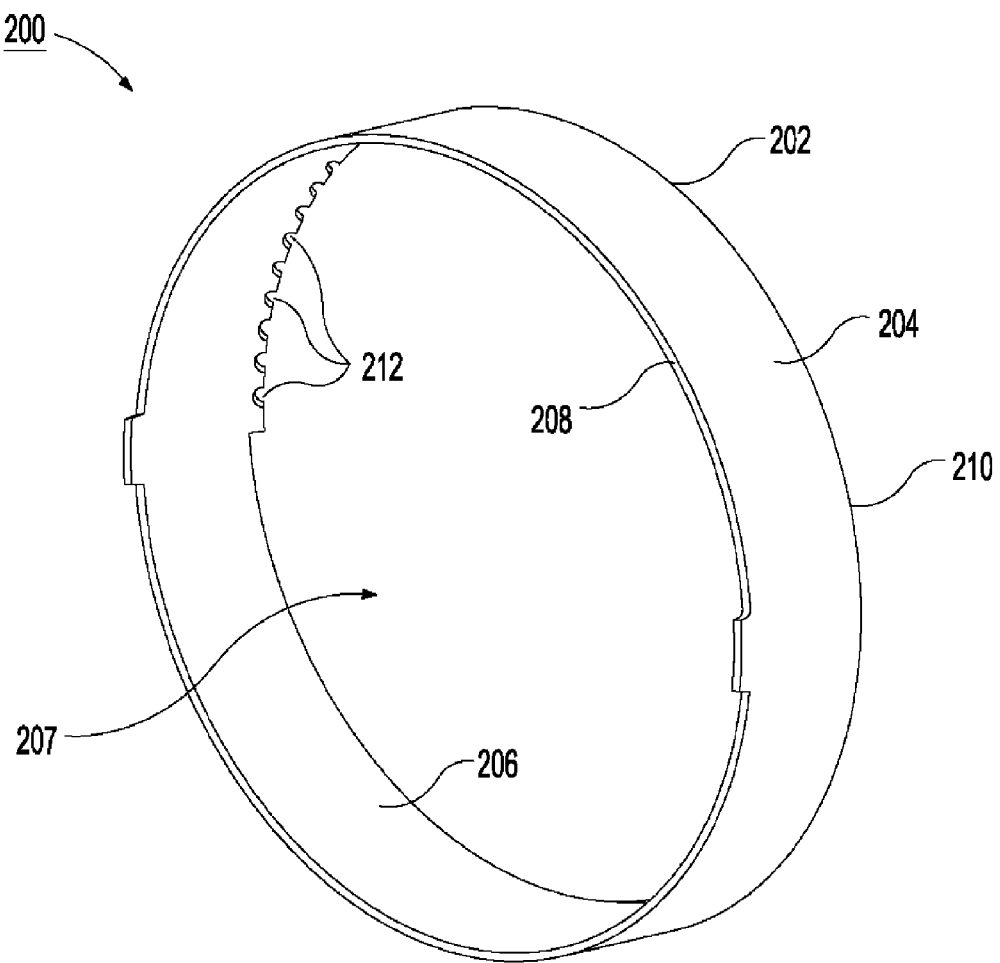
FIG. 17a is a perspective view illustrating an embodiment of an annular adjustment sleeve used with the annular support device of FIGS. 16a and 16b.
Figure 17B:
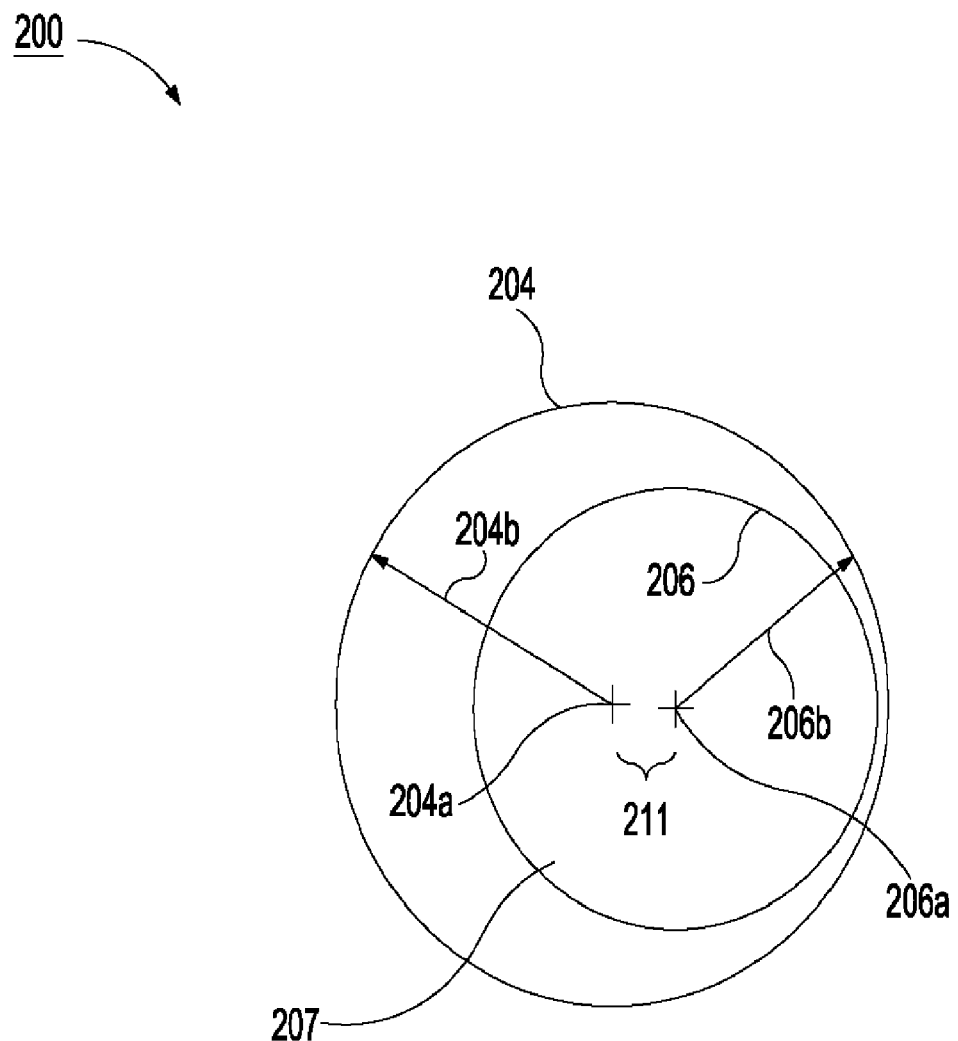

Referring now to FIGS. 17a and 17b, an exemplary annular adjustment sleeve 200 is illustrated. The annular adjustment sleeve 200 may include an annular body 202 having an adjustment sleeve outer circumferential surface 204, an adjustment sleeve inner circumferential surface 206 that is located opposite the annular body 202 from the adjustment sleeve outer circumferential surface 204, and a pair of opposing side surfaces 208 and 210 that extend between the adjustment sleeve outer circumferential surface 204 and the adjustment sleeve inner circumferential surface 206. As illustrated in the schematic view of the annular adjustment sleeve 200 in FIG. 17b, the adjustment sleeve outer circumferential surface 204 is located about a third axis 204a such that points on the adjustment sleeve outer circumferential surface 204 are generally located a distance 204b from the third axis 204a, the adjustment sleeve inner circumferential surface 206 is located about a fourth axis 206a such that points on the adjustment sleeve inner circumferential surface 206 are generally located a distance 206b from the fourth axis 206a, and the fourth axis 206a is spaced apart from the third axis 204a by a distance 211 (the distances 204b, 206b and 211 have been greatly exaggerated in the schematic view of FIG. 17b for purposes of discussion and illustration.) The adjustment sleeve inner circumferential surface 206 defines an adjustment sleeve bore 207 that shares the fourth axis 206a with the adjustment sleeve inner circumferential surface 206. A plurality of adjustment sleeve index slots 212 are defined by the annular body 202 and located adjacent the adjustment sleeve inner circumferential surface 206 and the side surface 210.

Figure 18:
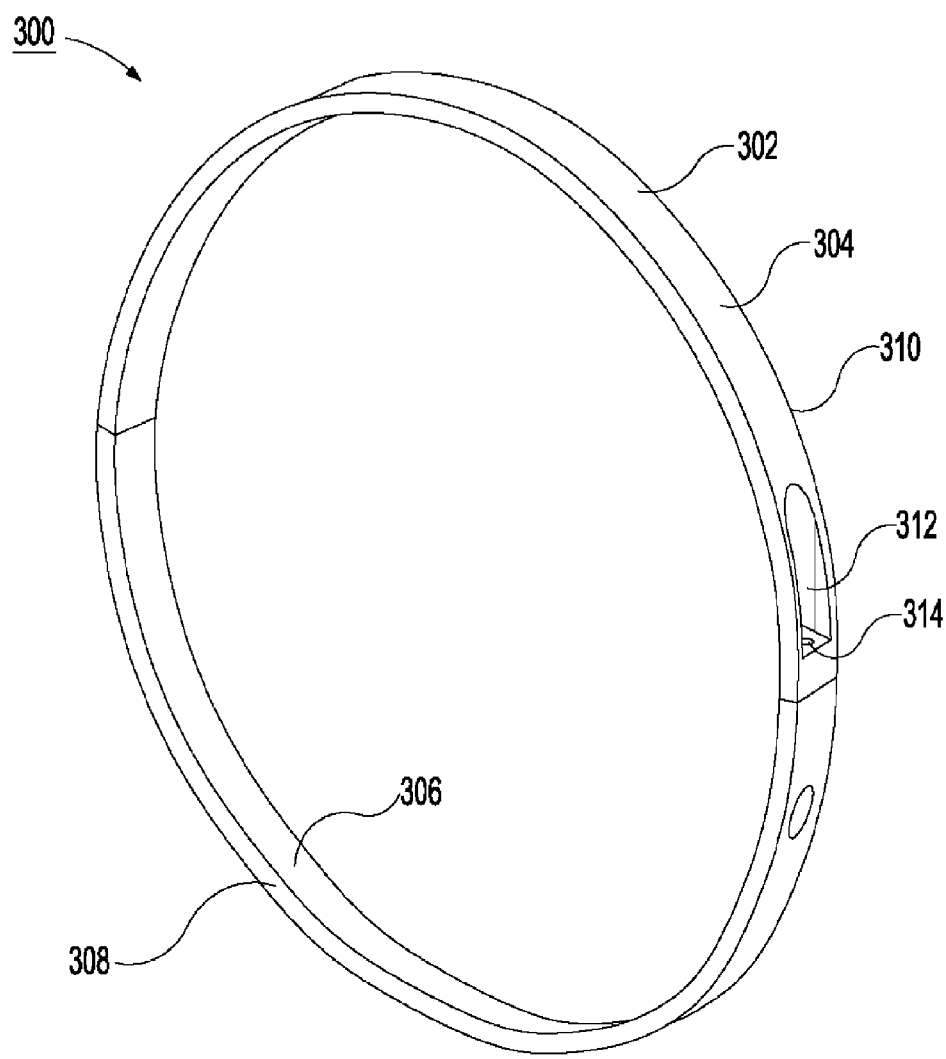
FIG. 18 is a perspective view illustrating an embodiment of an clamp member used with the annular support device of FIGS. 16a and 16b and the annular adjustment sleeve of FIGS. 17a and 17b.

Referring now to FIG. 18, an exemplary clamp member 300 is illustrated. The clamp member 300 can include an annular body 302 having a clamp member outer circumferential surface 304, a clamp member inner circumferential surface 306 that is located opposite the annular body 302 from the clamp member outer circumferential surface 304, and a pair of opposing side surfaces 308 and 310 that extend between the clamp member outer circumferential surface 304 and the clamp member inner circumferential surface 306. A clamping recess 312 may be defined by the annular body 302 and extends into the annular body 302 from the clamp member outer circumferential surface 304. A securing passageway 314 extends into the annular body 302 from the clamping recess 312. The securing passageway 314 may include features such as, for example, threaded portions, in order to allow the radius of the annular body 302 to be adjusted, as will be described in further detail below. In an embodiment, a clamping recess and securing passageway (not illustrated) that are substantially similar in structure and operation to the clamping recess 312 and securing passageway 314 may be located on the clamp member 300 opposite the clamping recess 312 and securing passageway 314.

Figure 19A:
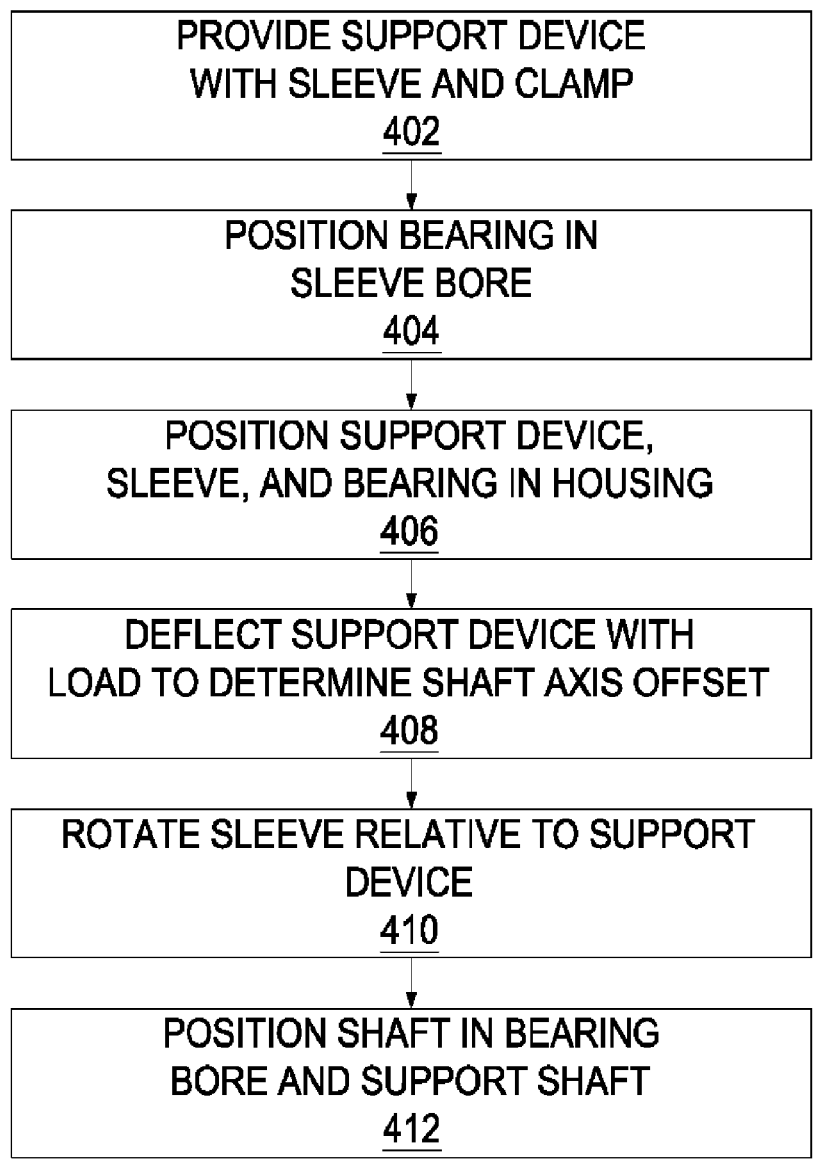
FIG. 19a is a flow chart illustrating an embodiment of a method for supporting and adjusting a shaft.
Figure 19B:
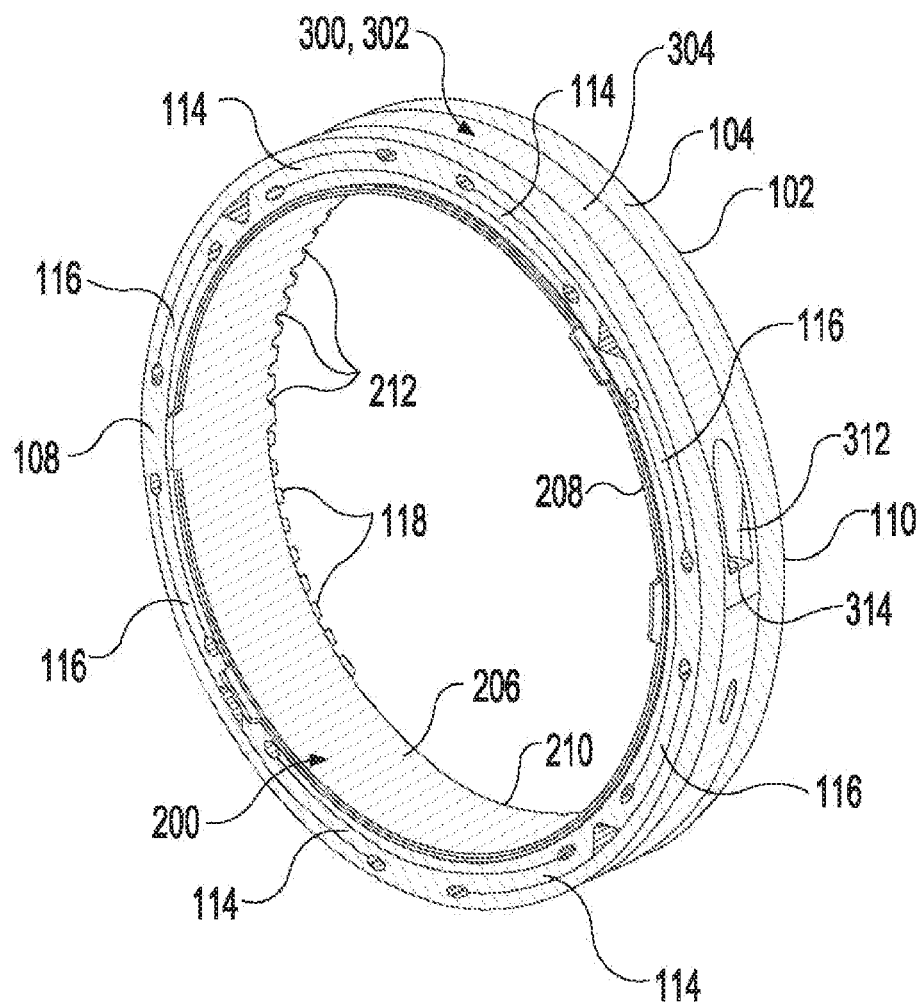
FIG. 19b is a perspective view illustrating an embodiment of the annular adjustment sleeve of FIGS. 17a and 17b and the clamp member of FIG. 18 coupled to the annular support device of FIGS. 16a and 16b.

Referring now to FIGS. 19a, 19b, 19c, 19d, 19e, 19f, and 19g, a method 400 for supporting and adjusting a shaft is illustrated. The method 400 begins at block 402 where a support device with a sleeve and a clamp is provided. In at least one embodiment, the annular support device 100 of FIGS. 16a and 16b is provided, and the annular adjustment sleeve 200 of FIGS. 17a and 17b is coupled to the annular support device 100 by positioning the annular adjustment sleeve 200 within the support device bore 112 defined by the annular support device 100 such that the adjustment sleeve outer circumferential surface 204 (FIG. 17a) is located immediately adjacent the support device inner circumferential surface 106 (FIG. 16a) and the side surfaces 108 and 110 on the annular support device 102 are substantially coplanar with the side surfaces 208 and 210, respectively, on the annular adjustment sleeve 200, as illustrated in FIG. 19b. The clamp member 300 of FIG. 18 may be coupled to the annular support device 100 by positioning the clamp member 300 in the clamp channel 113 such that the clamp member outer circumferential surface 304 is located adjacent the support device outer circumferential surface 104, as illustrated in FIG. 19b (also refer to FIG. 16a). With the annular adjustment sleeve 200 coupled to the annular support device 100, a plurality of the support device index slots 118 are located adjacent a plurality of the adjustment sleeve index slots 212. In an embodiment, a clamping actuator (e.g., a screw) may be positioned in the securing passageway 314.

Figure 19C:
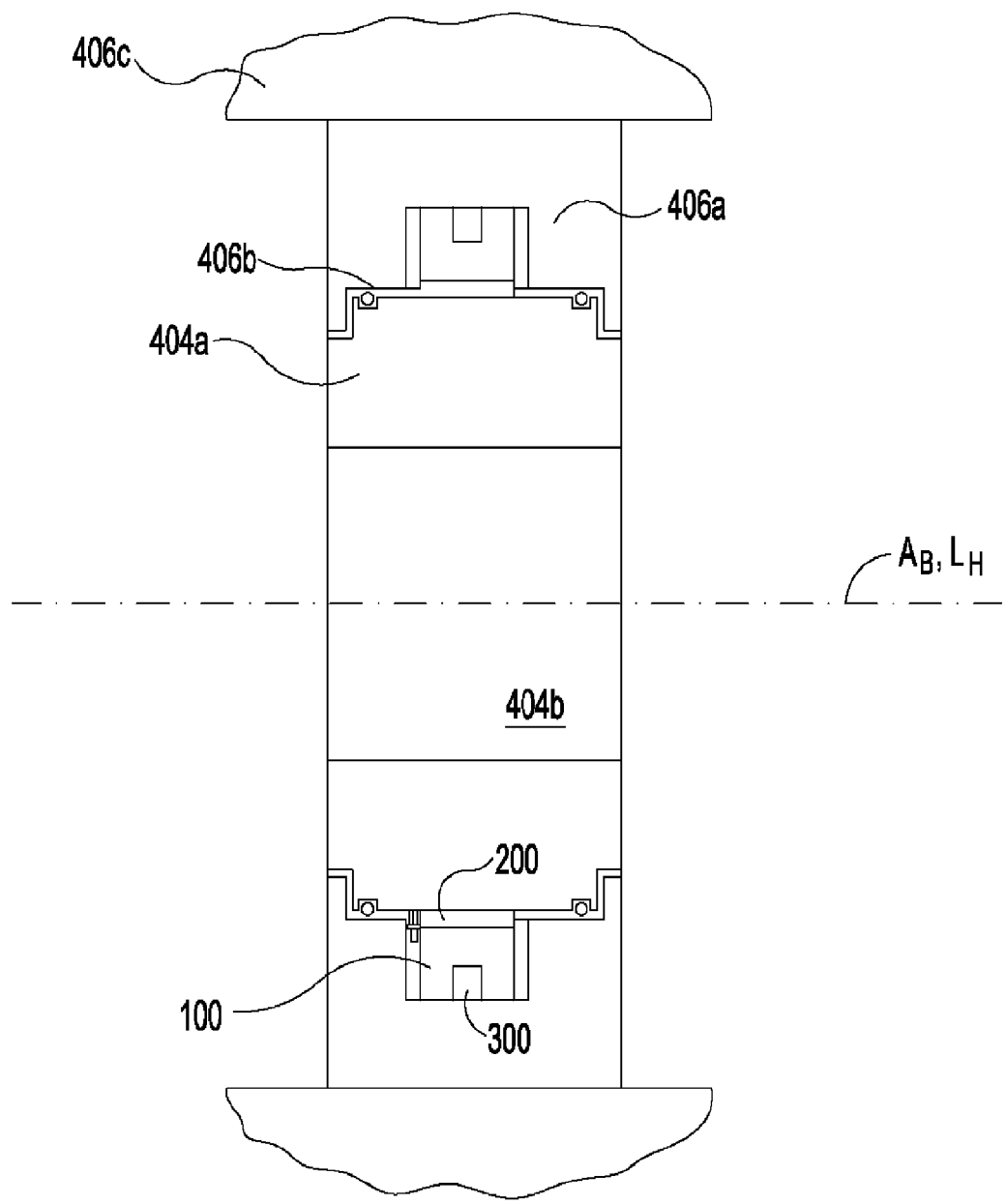
FIG. 19c is a partial cross-sectional view illustrating an embodiment of the annular support device, the annular adjustment sleeve, and the clamp member of FIG. 19b coupled to a housing and a bearing.

The method 400 then proceeds to blocks 404 and 406 where a bearing may be positioned in the adjustment sleeve bore 207, and the annular support device 100, the annular adjustment sleeve 200, and the bearing are positioned in a housing. Referring now to FIG. 19c, a bearing 404a (which may be the bearing 3 described above) that defines a bearing bore 404b (which may be the bore 5 described above) having a bearing bore axis $A_B$, is positioned in the adjustment sleeve bore 207 (FIGS. 17a and 17B). In an embodiment, the bearing 404a may include a pin that becomes located in one of the support device index slots 118 and one of the adjustment sleeve index slots 212 in order to prevent rotation of the bearing 404a relative to the annular support device 100 and the annular adjustment sleeve 200. The radius of the annular body 302 (FIGS. 17a and 19b) on the clamp member 300 may then be adjusted by, for example, coupling a threaded member to threaded portions of the clamp member 300, in order to secure the annular support device 100 and the annular adjustment sleeve 200 to the bearing 404a. In an embodiment, the bearing bore axis $A_B$ lies along a desired centerline $L_H$ when there is no shaft positioned in the bearing bore 202b, as illustrated. A housing 406a (which may be the housing 2 described above) that defines a housing bore 406b (which may be the bore 4 described above) and that is coupled to a casing 406c (which may be the turbomachine casing 8 described above) is provided, and the annular support device 100, the annular adjustment sleeve 200, the clamp member 300, and the bearing 404a, are positioned in the housing bore 406b.

The method 400 then proceeds to block 408 where the support device may be deflected with a load to determine a shaft axis offset. As described above with reference to FIG. 2, a shaft S may be positioned in the bearing bore 5 (or 404b in FIG. 19c) of the bearing 3 (or 404a in FIG. 19c). The mass of the shaft S produces a shaft deflection which causes points on the axis $A_S$ of the shaft S to deflect from the desired centerline $L_H$. As the mass of the shaft S is a known quantity, a load equal to the mass of the shaft S may be applied to the bearing 404a that will cause a deflection of support device 100 (and/or the bearing 404a, the adjustment sleeve 200, etc). This deflection will result in the bearing bore axis $A_B$ being offset from the desired centerline $L_H$, and is indicative of an offset of the axis $A_S$ of the shaft S from the desired centerline $L_H$ that will occur when the shaft S is positioned in the bearing bore 404b.

Figure 19D:
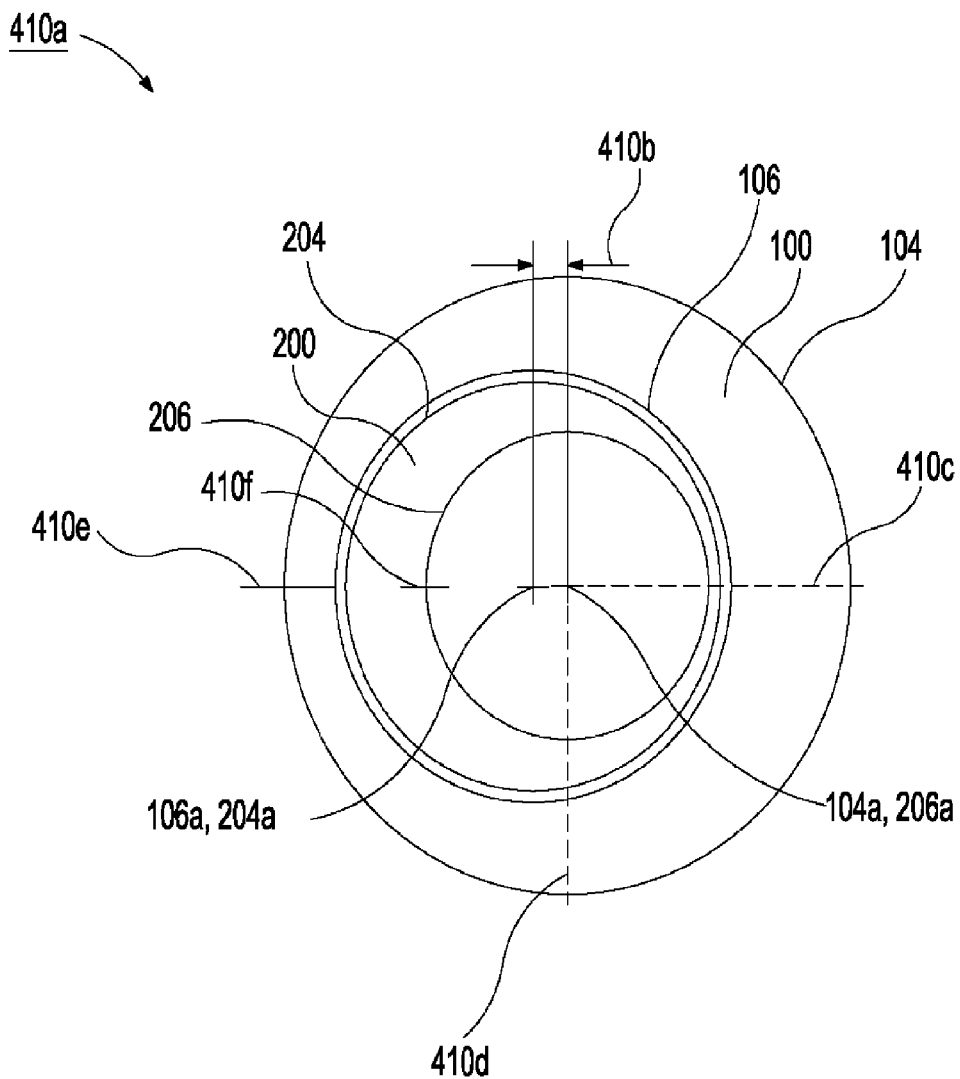
FIG. 19d is a schematic view illustrating an embodiment of the annular support device of FIGS. 16a and 16b and the annular adjustment sleeve of FIGS. 17a and 17b in a first orientation.

The method 400 then proceeds to block 410 where the sleeve may be rotated relative to the support device. The annular support device 100, the annular adjustment sleeve 200, the clamp member 300, and the bearing 404a, may be removed from the housing bore 406b, and the radius of the annular body 302 on the clamp member 300 may then be adjusted such that the bearing 404a may be removed from the adjustment sleeve bore 207. With the annular adjustment sleeve 200 coupled to the annular support device 100 as described according to block 402 of the method 400, the annular adjustment sleeve 200 may be positioned relative to the annular support device 100 in a first orientation 410a (e.g., before blocks 404, 406, and 408 of the method 400 in which the shaft deflection under a load was determined) such that the first axis 104a on the annular support device 100 is substantially co-linear with the fourth axis 206a on the annular adjustment sleeve 200 and the second axis 106a on the annular support device 100 is substantially co-linear with the third axis 204a on the annular adjustment sleeve 200, as illustrated in FIG. 19d. In the first orientation 410a, the second axis 106a and the third axis 204a are separated from the first axis 104a and the fourth axis 206a by a distance 410b. The distance 410b, which may be referred to as the "manufactured eccentricity" of the system, may be varied during the manufacture of the annular support device 100 and the annular adjustment sleeve 200 in order to enable a "vertical offset range" of the fourth axis 206a, as will be explained below in further detail. For clarity of discussion, a horizontal reference line 410c, a vertical reference line 410d that is perpendicular to the horizontal reference line 410c, a support device rotation reference line 410e that follows the rotation of the annular support device 100, and an adjustment sleeve rotation reference line 410f that follows the rotation of the annular adjustment sleeve 200, are provided in FIGS. 19d, 19e, 19f, and 19g. In the first orientation 410a, the horizontal reference line 410c and the vertical reference line 410d intersect each other, the first axis 104a, and the fourth axis 206a at the same point, as illustrated in FIG. 19d. Also in the first orientation 410a, the support device rotation reference line 410e and the adjustment sleeve rotation reference line 410f may be substantially co-linear with each other and the horizontal reference line 410c.

Figure 19E:
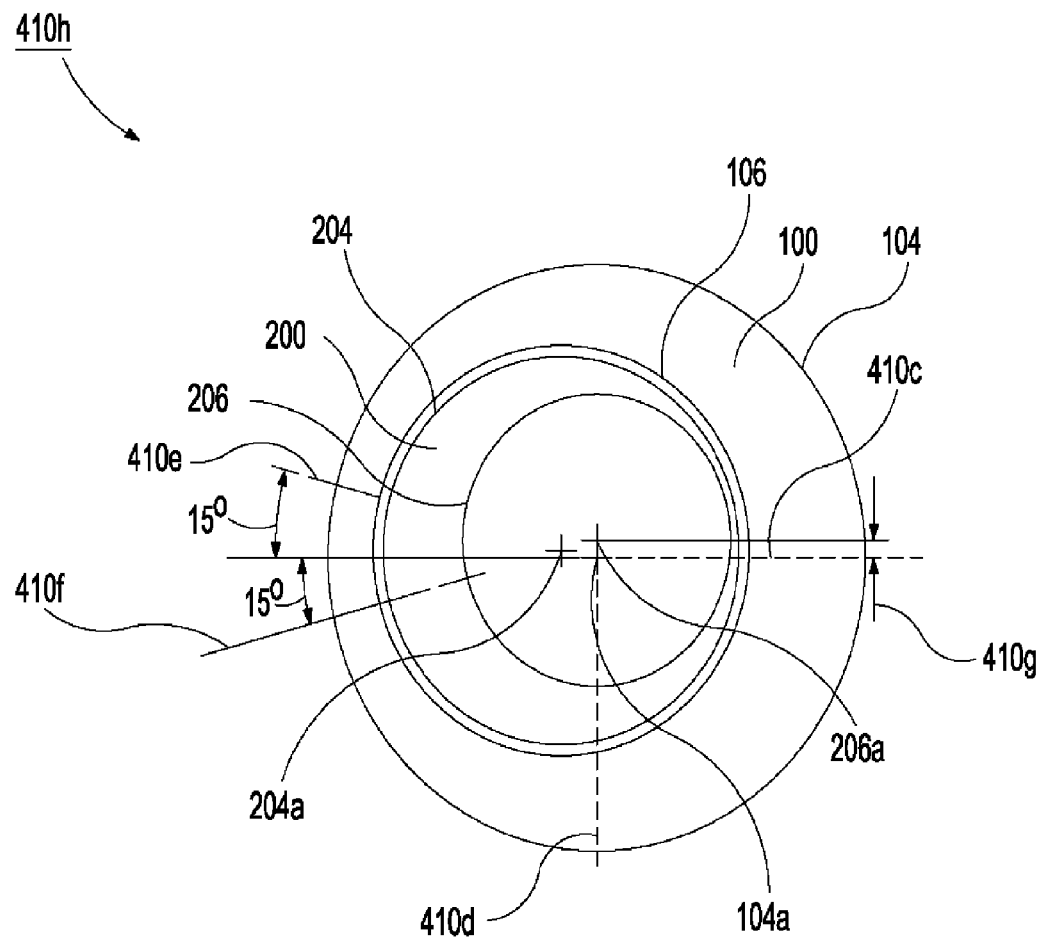
FIG. 19e is a schematic view illustrating an embodiment of the annular support device and the annular adjustment sleeve of FIG. 19d rotated in equal amounts and opposite directions and into a second orientation.
Figure 19F:
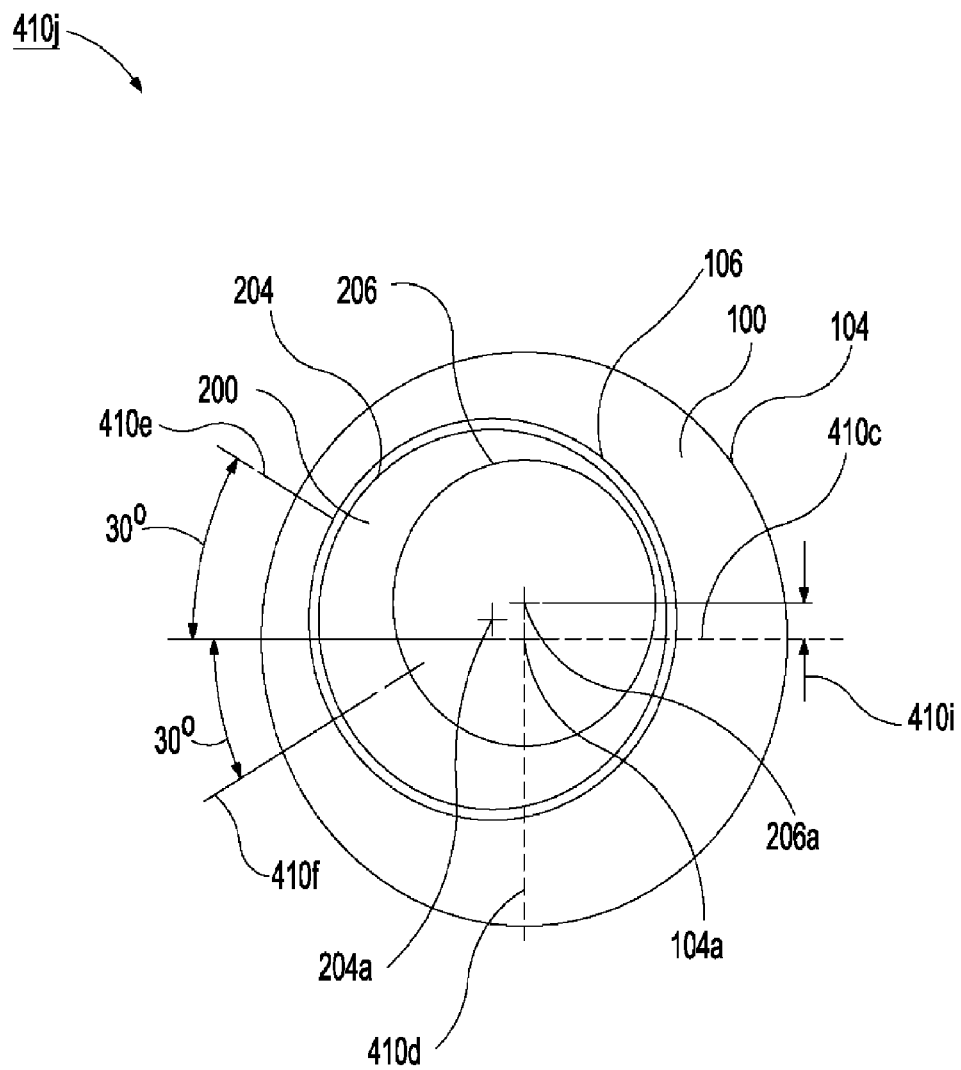
FIG. 19f is a schematic view illustrating an embodiment of the annular support device and the annular adjustment sleeve of FIG. 19d rotated in equal amounts and opposite directions and into a third orientation.
Figure 19G:
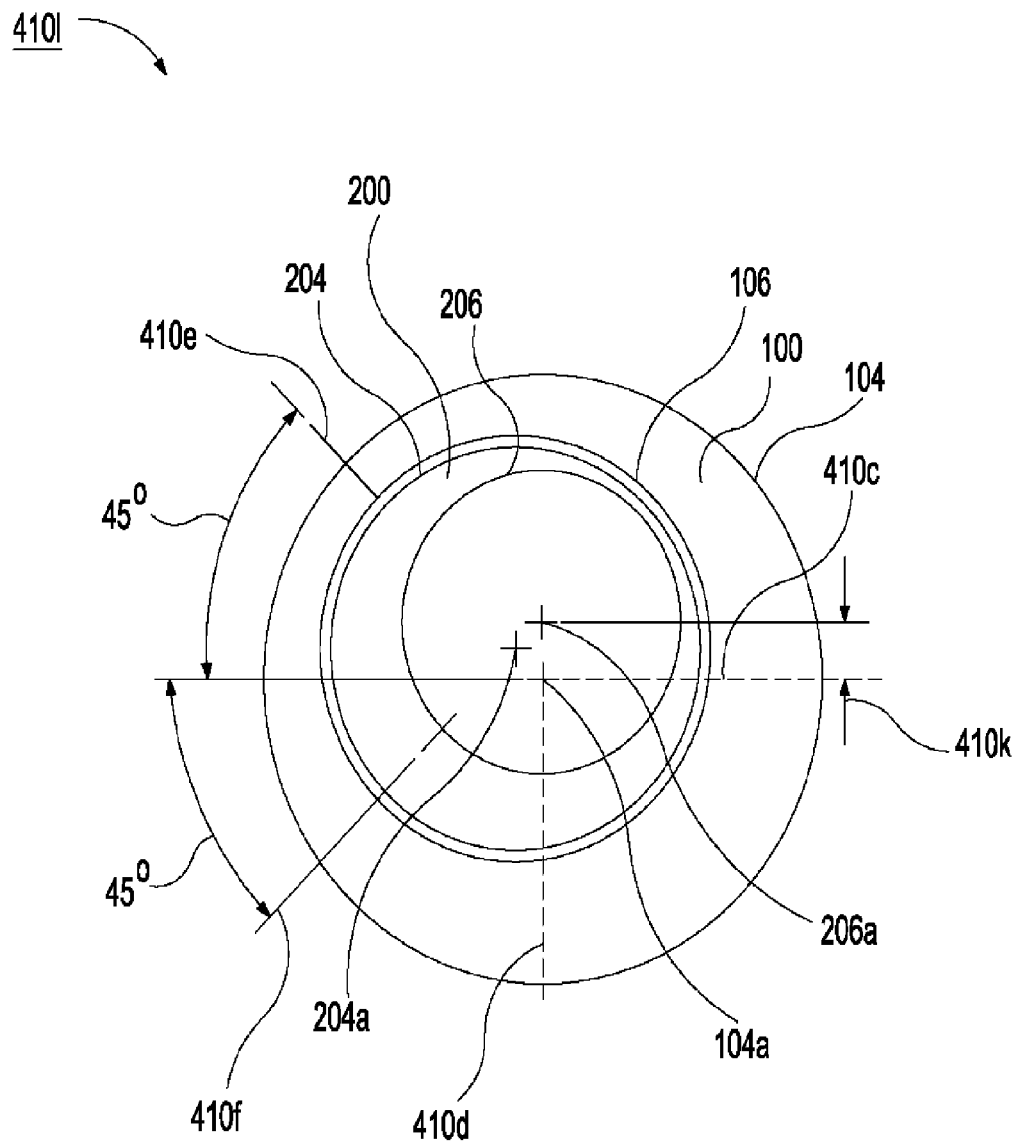
FIG. 19g is a schematic view illustrating an embodiment of the annular support device and the annular adjustment sleeve of FIG. 19d rotated in equal amounts and opposite directions and into a fourth orientation.

The annular adjustment sleeve 200 may then be rotated relative to the annular support device 100. In the illustrated embodiment, the annular support device 100 is rotated about the first axis 104a and the annular adjustment sleeve 200 is rotated about the third axis 204a in an equal amount and opposite direction to the annular support device 100, as illustrated in FIGS. 19e, 19f, and 19g. When the annular adjustment sleeve 200 and the annular support device 100 are rotated in such a manner, the fourth axis 206a will move along a line that is co-linear with the vertical reference line 410d but will not change its horizontal position with respect to the horizontal reference line 410c. The distance that the fourth axis 206a will move, which may be referred to as the "vertical offset" of the fourth axis 206a, may be determined by the equation:

Vertical offset=2*(manufactured eccentricity)*sin (amount of rotation from the horizontal reference line)

Referring to FIG. 19e, the annular support device 100 has been rotated in a first direction such that the support device rotation reference line 410e forms a 15 degree angle with the horizontal reference line 410c, and the annular adjustment sleeve 200 has been rotated in a second direction that is opposite the first direction in which the annular support device 100 was rotated such that the adjustment sleeve rotation reference line 410f forms a 15 degree angle with the horizontal reference line 410c. In response to rotating the annular support device 100 and the annular adjustment sleeve 200 as described, the fourth axis 206a may move relative to the first axis 104a a distance 410g along a line (the movement along the line also being relative to a perimeter of the annular support device 100 that, in the illustrated embodiment, lies along the support device outer circumferential surface 104) that is collinear with the vertical reference line 410d, and the annular support device 100 and the annular adjustment sleeve 200 move into a second orientation 410h, as illustrated in FIG. 19e. For a manufactured eccentricity, or distance 410b in FIG. 19c, of 0.01 inches, the vertical offset, or distance 410g, for the embodiment illustrated in FIG. 19e will be 0.005 inches, according to the equation for the vertical offset described above.

Referring to FIG. 19f, the annular support device 100 has been rotated further in the first direction such that the support device rotation reference line 410e forms a 30 degree angle with the horizontal reference line 410c, and the annular adjustment sleeve 200 has been rotated further in the second direction that is opposite the first direction in which the annular support device 100 was rotated such that the adjustment sleeve rotation reference line 410f forms a 30 degree angle with the horizontal reference line 410c. In response to rotating the annular support device 100 and the annular adjustment sleeve 200 as described, the fourth axis 206a moves relative to the first axis 104a a distance 410i along a line (the movement along the line also being relative to a perimeter of the annular support device 100 that, in the illustrated embodiment, lies along the support device outer circumferential surface 104) that is collinear with the vertical reference line 410d, and the annular support device 100 and the annular adjustment sleeve 200 move into a third orientation 410j, as illustrated in FIG. 19f. For a manufactured eccentricity, or distance 410b in FIG. 19c, of 0.01 inches, the vertical offset, or distance 410i for the embodiment illustrated in FIG. 19f, will be 0.010 inches, according to the equation for the vertical offset described above. Referring to FIG. 19g, the annular support device 100 has been rotated further in the first direction such that the support device rotation reference line 410e forms a 45 degree angle with the horizontal reference line 410c, and the annular adjustment sleeve 200 has been rotated further in the second direction that is opposite the first direction in which the annular support device 100 was rotated such that the adjustment sleeve rotation reference line 410f forms a 45 degree angle with the horizontal reference line 410c. In response to rotating the annular support device 100 and the annular adjustment sleeve 200 as described, the fourth axis 206a moves relative to the first axis 104a a distance 410k along a line (the movement along the line also being relative to a perimeter of the annular support device 100 that, in the illustrated embodiment, lies along the support device outer circumferential surface 104) that is collinear with the vertical reference line 410d, and the annular support device 100 and the annular adjustment sleeve 200 move into a fourth orientation 410l, as illustrated in FIG. 19g. For a manufactured eccentricity, or distance 410b in FIG. 19c, of 0.010 inches, the vertical offset, or distance 410k for the embodiment illustrated in FIG. 19g, will be 0.014 inches, according to the equation for the vertical offset described above.

In exemplary embodiments, as can be seen from FIGS. 19d, 19e, 19f, and 19g, the shapes and positions of the support device bore 112 defined by the annular support device 100 and the adjustment sleeve bore 207 defined by the annular adjustment sleeve 200 allow the annular support device 100 and the annular adjustment sleeve 200 to be coupled together and oriented such that rotation of the annular support device 100 and the annular adjustment sleeve 200 in equal amounts and opposite directions allows the fourth axis 206a to be moved along a line (relative to a perimeter of the annular support device 100 that, in the illustrated embodiment, lies along the support device outer circumferential surface 104) without movement of the fourth axis 206a in a direction that is perpendicular to that line (relative to a perimeter of the annular support device 100 that, in the illustrated embodiment, lies along the support device outer circumferential surface 104). With information about the deflection that was determined in block 408 of the method 400, a vertical offset may be applied to the fourth axis 206a at block 410 of the method 400 that will ensure that the shaft axis is positioned along a desired centerline during operation, as will be discussed in further detail below. In an embodiment, after block 410 of the method 400 in which the annular adjustment sleeve 200 is rotated relative to the annular support device 100 according to deflection determined in block 408 of the method 400, blocks 404, 406, 408, and 410 of the method 400 may be repeated until it has been determined that the offset provided has achieved the desired shaft positioning.

Furthermore, during the rotation of the annular support device 100 and the annular adjustment sleeve 200 in block 410 of the method 400, the support device index slots 118 and the adjustment sleeve index slots 212 may move relative to each other. When the desired vertical offset of the fourth axis 206a is achieved, at least one of the support device index slots 118 and at least one of the adjustment sleeve index slots 212 will be located adjacent each other, as illustrated by the aligned index slots 410a in FIG. 19h. The clamp member 300 may then be tightened, for example, by tightening a clamping actuator (e.g., a screw) that is positioned in the securing passageway 314, in order to provide a radial force to the annular support device 100 that is directed toward the first axis 104a and that "locks" the position of the annular support device 100 and the annular adjustment sleeve 200 relative to each other. In an embodiment, the clamp member 300 may not be positioned in the clamp channel 113 and tightened until the annular support device 100 and the annular adjustment sleeve 200 have been rotated to provide a desired vertical offset of the fourth axis 206a.

Figure 19H:
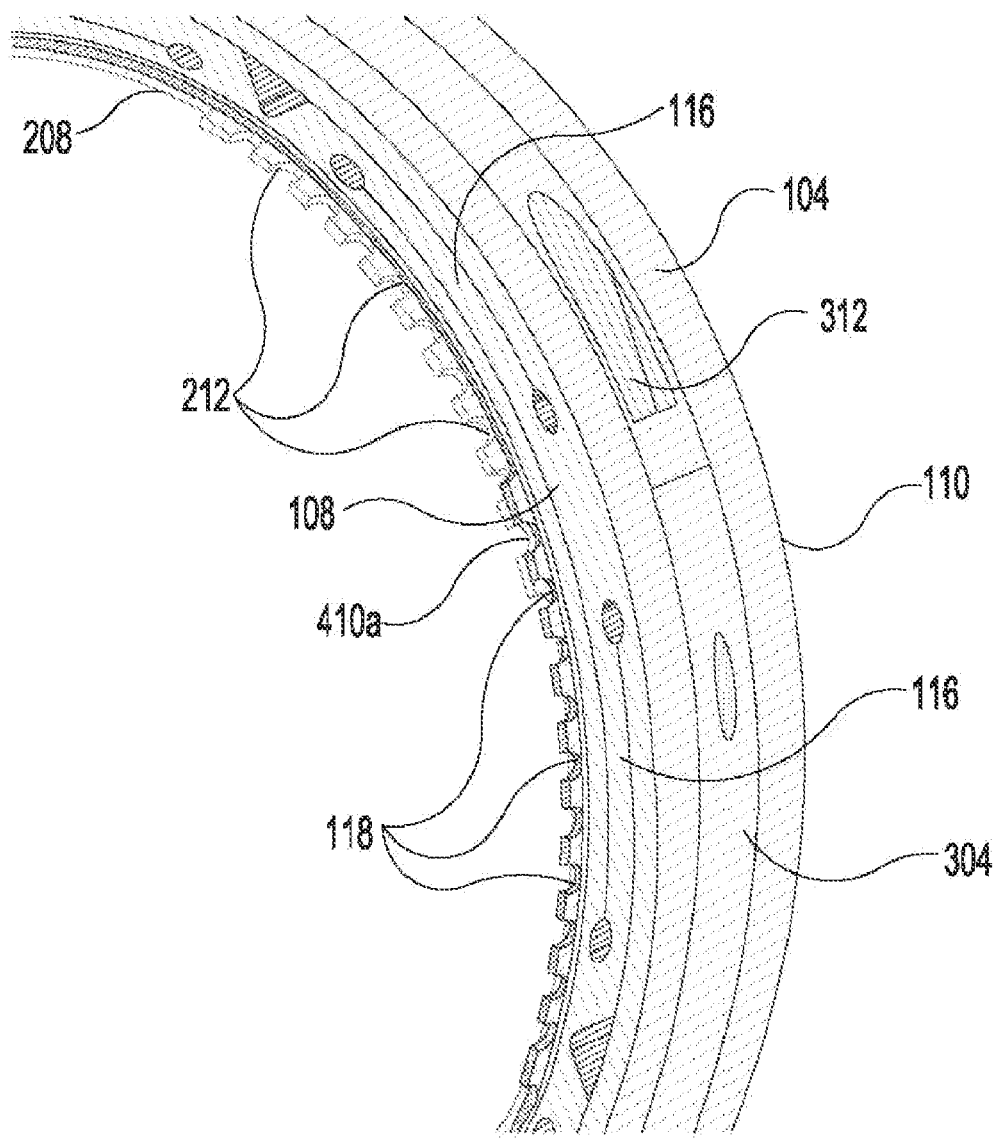
FIG. 19h is a partial perspective view illustrating an embodiment of the annular adjustment sleeve of FIGS. 17a and 17b and the clamp member of FIG. 18 coupled to the annular support device of FIGS. 16a and 16b with a support device index slot aligned with an adjustment sleeve index slot.
Figure 19I:
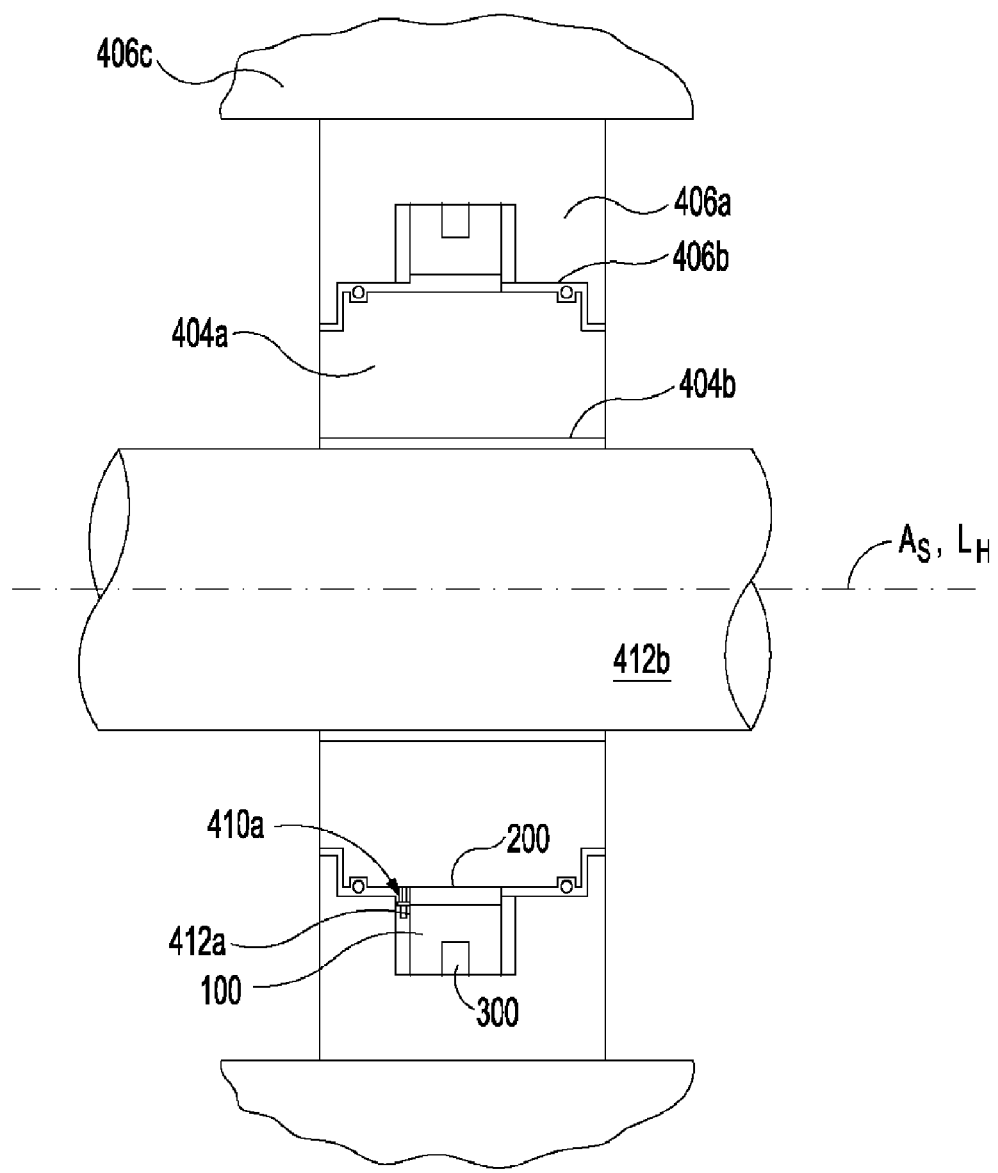
FIG. 19i is a partial cross-sectional view illustrating an embodiment of the annular support device, the annular adjustment sleeve, and the clamp member of FIG. 19b coupled to a housing, a bearing, and a shaft.

The method 400 then proceeds to block 412 where a shaft may be positioned in the bearing bore and supported. Referring now to FIG. 19i, the annular support device 100, annular adjustment sleeve 200, and clamp 300 may be coupled to the bearing 404a and positioned in the housing 406a. The bearing 410a may be coupled to a securing member 412a (e.g., a pin) that is positioned in the aligned index slots 410a when the bearing 404a is positioned in the adjustment sleeve bore 207, as illustrated in FIGS. 19h and 19i, in order to prevent rotation of the annular support device 100 and the annular adjustment sleeve 200 relative to each other and the bearing 404a. A shaft 412b (which may be the shaft S described above) having an axis $A_S$ is positioned in the bearing bore 404b. As described above, the mass of the shaft 412b produces a shaft deflection in which points on the axis $A_S$ of the shaft 412b deflect from a desired centerline $L_H$. However, by vertically offsetting the fourth axis 206a in block 410 of the method 400, according to the offset determined in block 408 of the method 400, the adjustment sleeve bore 207, the bearing 404a, and the bearing bore 404b can be moved such that, when the shaft 412b is positioned in the bearing bore 404b, the axis $A_S$ of the shaft 412b is substantially co-linear with the desired centerline $L_H$, as illustrated in FIG. 19i. Thus, a system and method have been described that allows a shaft to be supported by a support device that includes an adjustment sleeve that may be rotated relative to the support device to adjust the position of the shaft to align the axis of the shaft with a desired centerline.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A bearing assembly support and adjustment system, comprising:
an annular support device having a support device outer circumferential surface located about a first axis, and a support device inner circumferential surface located about a second axis spaced apart from the first axis;

an annular adjustment sleeve having an adjustment sleeve outer circumferential surface located about a third axis and an adjustment sleeve inner circumferential surface located about a fourth axis spaced apart from the third axis, wherein the annular adjustment sleeve is coupled to the annular support device with the adjustment sleeve outer circumferential surface located immediately adjacent the support device inner circumferential surface; and a clamp member located in a clamp channel defined by the annular support device, the clamp member being coupled to the annular support device and being operable to provide a radial force to the annular support device directed towards the first axis.

2. The system of claim 1, wherein the annular support device further comprises a plurality of spring portions extending between the support device inner circumferential surface and the support device outer circumferential surface, the plurality of spring portions being adapted to deflect a load force from a shaft disposed within the annular support device.

3. The system of claim 1, further comprising a plurality of support device index slots defined by the annular support device.

4. The system of claim 3, further comprising a plurality of adjustment sleeve index slots defined by the annular adjustment sleeve, wherein with the annular adjustment sleeve coupled to the annular support device, at least one of the plurality of adjustment sleeve index slots is located adjacent at least one of the plurality of support device index slots.

5. The system of claim 1, wherein the annular support device is operable to be rotated relative to the annular adjustment sleeve in order to move the fourth axis along a line relative to the first axis.

6. A shaft support and adjustment system, comprising:
a bearing coupled to a housing and defining a bore having a shaft located therein; and
a support and adjustment device located between the housing and the bearing, wherein the support and adjustment device comprises:
an annular support device having a support device outer circumferential surface located about a first axis and engages the housing and a support device inner circumferential surface located about a second axis spaced apart from the first axis, wherein a plurality of spring portions extend between the support device inner circumferential surface and the support device outer circumferential surface;
an annular adjustment sleeve having an adjustment sleeve outer circumferential surface located about a third axis and engages the support device inner circumferential surface, and an adjustment sleeve inner circumferential surface that engages the bearing and is located about a fourth axis spaced apart from the third axis, wherein the annular support device is operable to be rotated relative to the annular adjustment sleeve in order to move the fourth axis along a line relative to a perimeter of the annular support device; and
a clamp member disposed in a clamp channel defined by the annular support device, the clamp member being coupled to the annular support device and being operable to provide a radial force to the annular support device directed towards the first axis.

7. The system of claim 6, wherein the plurality of spring portions comprise a plurality of first spring portions having a first stiffness and a plurality of second spring portions having a second stiffness, and wherein the second stiffness is greater than the first stiffness.

8. The system of claim 6, further comprising a plurality of support device index slots defined by the annular support device.

9. The system of claim 8, further comprising a plurality of adjustment sleeve index slots defined by the annular adjustment sleeve, wherein a securing member is located in at least one of the plurality of support device index slots and at least one of the plurality of adjustment sleeve index slots in order to prevent rotation of the annular adjustment sleeve relative to the annular support device.

10. The system of claim 6, wherein the clamp channel extends into the annular support device from a substantially central location on the support device outer circumferential surface, and wherein the clamp member is disposed in the clamp channel such that a clamp member outer circumferential surface is located adjacent the support device outer circumferential surface.

11. The system of claim 6, wherein the line along which the fourth axis moves in response to rotation of the annular support device relative to the annular adjustment sleeve comprises a vertical line that extends radially from the fourth axis prior to rotation of the annular support device relative to the annular adjustment sleeve, and wherein the rotation of the annular support device relative to the annular adjustment sleeve prevents the fourth axis from moving along a horizontal line in a direction perpendicular to the vertical line.

12. A method for supporting and adjusting a shaft, comprising:
providing an annular support device coupled to an annular adjustment sleeve, wherein the annular adjustment sleeve defines an adjustment sleeve bore operable to receive the shaft;
deflecting the annular support device with a load of the shaft to determine an offset of a shaft axis relative to a desired axis when the shaft is positioned in the adjustment sleeve bore;
rotating the annular support device relative to the annular adjustment sleeve in order to move an axis of the adjustment sleeve bore such that the offset of the shaft axis relative to the desired axis is reduced when the shaft is positioned in the adjustment sleeve bore; and
positioning a clamp member in a clamp channel defined by the annular support device.

13. The method of claim 12, further comprising tightening the clamp member to secure the position of the annular support device and the annular adjustment sleeve.

14. The method of claim 12, further comprising positioning a securing member in at least one support device index slot and in at least one adjustment sleeve index slot in order to prevent rotation of the annular adjustment sleeve relative to the annular support device.

15. The method of claim 12, wherein rotating the annular support device relative to the annular adjustment sleeve in order to move an axis of the adjustment sleeve bore such that the offset of the shaft axis relative to the desired axis is reduced comprises moving the axis of the adjustment sleeve bore along a line relative to a perimeter of the annular support device.

16. The method of claim 12, further comprising:

positioning a bearing that defines a bearing bore in the adjustment sleeve bore;

positioning the annular support device, the annular adjustment sleeve, and the bearing in a housing;

positioning the shaft in the bearing bore; and supporting the shaft, wherein the moving of the axis of the adjustment sleeve bore positions the shaft axis along the desired axis.

* * * * *